US012694501B2

(12) United States Patent (10) Patent No.: US 12,694,501 B2
Nishi et al. (45) Date of Patent: Jul. 28, 2026

(54) WAVE MOTION ANALYSIS DEVICE, SCANNING DEVICE, WAVE MOTION ANALYSIS SYSTEM, WAVE MOTION ANALYSIS METHOD, AND PROGRAM

(71) Applicant: Konica Minolta, Inc., Tokyo (JP)

(72) Inventors: Mizuho Nishi, Kyoto (JP); Yasuhito Watanabe, Takatsuki (JP); Mineo Tsushima, Seika-cho (JP)

(73) Assignee: Konica Minolta, Inc., Tokyo (JP)

( * ) Notice: Subject to any disclaimer, the term of this patent is extended or adjusted under 35 U.S.C. 154(b) by 268 days.

(21) Appl. No.: 18/566,444

(22) PCT Filed: Mar. 25, 2022

(86) PCT No.: PCT/JP2022/014463
§ 371 (c)(1),
(2) Date: Dec. 1, 2023

(87) PCT Pub. No.: WO2022/259710
PCT Pub. Date: Dec. 15, 2022

(65) Prior Publication Data
US 2024/0273701 A1 Aug. 15, 2024

(30) Foreign Application Priority Data
Jun. 10, 2021 (JP) ................................ 2021-097541

(51) Int. Cl.
*G06T 7/00* (2017.01)
*G01N 29/06* (2006.01)
(Continued)

(52) U.S. Cl.
CPC ......... *G06T 7/0004* (2013.01); *G01N 29/069* (2013.01); *G01N 29/26* (2013.01);
(Continued)

(58) Field of Classification Search
CPC ......... G06T 7/0004; G06T 2207/10088; G06T 2207/10132; G06T 2207/20056;
(Continued)

(56) References Cited

U.S. PATENT DOCUMENTS

2010/0037695 A1* 2/2010 Tsujita ............... G01N 21/1702
702/167
2018/0340913 A1 11/2018 Mizuno et al.
(Continued)

FOREIGN PATENT DOCUMENTS

JP H05333000 A 12/1993
JP 2001208527 A 8/2001
(Continued)

OTHER PUBLICATIONS

International Search Report (ISR) dated Jun. 14, 2022 issued in PCT/JP2022/014463 and its English translation.
(Continued)

*Primary Examiner* — Wednel Cadeau
(74) *Attorney, Agent, or Firm* — RANKIN, HILL & CLARK LLP

(57) ABSTRACT

A wave motion analysis device 100 that detects a defect of an inspection object on the basis of a reflection wave obtained from the inspection object, and includes a multiple reflection area extraction unit 106 that acquires tomographic data generated on the basis of the reflection wave and extracts, from the tomographic data, a multiple reflection area corresponding to a depth range deeper than a depth at which a real image of the inspection object is able to be detected and being an area in which a multiple reflection signal is able to be mainly detected, and a detection unit 107 that detects a multiple reflection image corresponding to the defect of the inspection object from the extracted multiple reflection area.

20 Claims, 17 Drawing Sheets

(51) Int. Cl.
   *G01N 29/26* (2006.01)
   *G06T 12/20* (2026.01)
(52) U.S. Cl.
   CPC ........ *G06T 12/20* (2026.01); *G01N 2291/023* (2013.01); *G01N 2291/0289* (2013.01); *G06T 2207/10088* (2013.01); *G06T 2207/10132* (2013.01); *G06T 2207/20056* (2013.01); *G06T 2207/30108* (2013.01)
(58) Field of Classification Search
   CPC ........ G06T 2207/30108; G01N 29/069; G01N 29/26; G01N 2291/023; G01N 2291/0289
   See application file for complete search history.

(56) References Cited

U.S. PATENT DOCUMENTS

| | | | | |
|---|---|---|---|---|
| 2020/0253470 | A1* | 8/2020 | Uji | A61B 3/12 |
| 2021/0007712 | A1* | 1/2021 | Fuse | A61B 8/54 |
| 2021/0096246 | A1* | 4/2021 | Bourgelas | G01S 7/4808 |

FOREIGN PATENT DOCUMENTS

| | | | | |
|---|---|---|---|---|
| JP | 2010175519 | A | 8/2010 | |
| WO | 2013161835 | A1 | 10/2013 | |
| WO | WO-2013161834 | A1 * | 10/2013 | G01N 29/07 |

OTHER PUBLICATIONS

Written Opinion of the International Searching Authority dated Jun. 14, 2022 issued in PCT/JP2022/014463 and its English translation.
Masayasu Ito, and Tsuyoshi Mochizuki, "Ultrasonic Diagnostic Apparatus", published by Corona Publishing Co., Ltd., Aug. 26, 2002.
Extended European Search Report (EESR) dated Nov. 5, 2024 for European Patent Application No. 22819899.0.
Japanese Office Action (JPOA) dated Mar. 18, 2025 for Japanese Patent Application No. 2023-527530; English translation.

* cited by examiner

*FIG. 1*

*FIG. 4A*
MOVE BY PREDETERMINED PITCH
FOR EACH TRANSMISSION EVENT
(ELECTRONIC SCANNING)
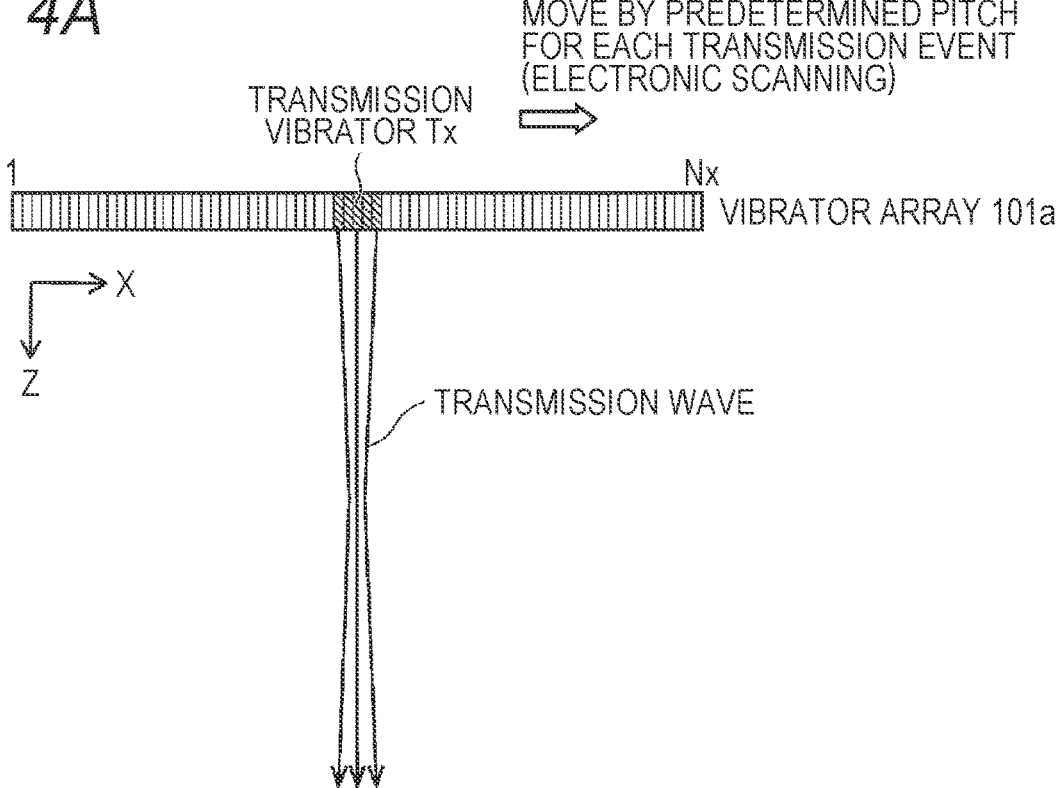
*FIG. 4B*
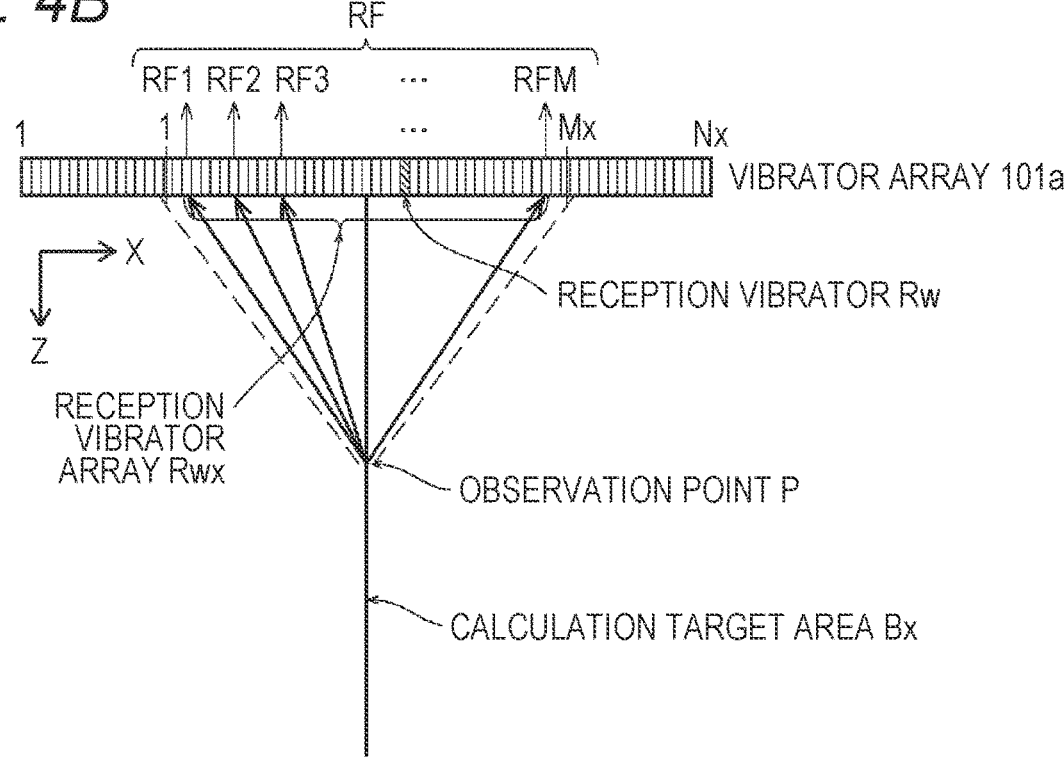

FIG. 6A
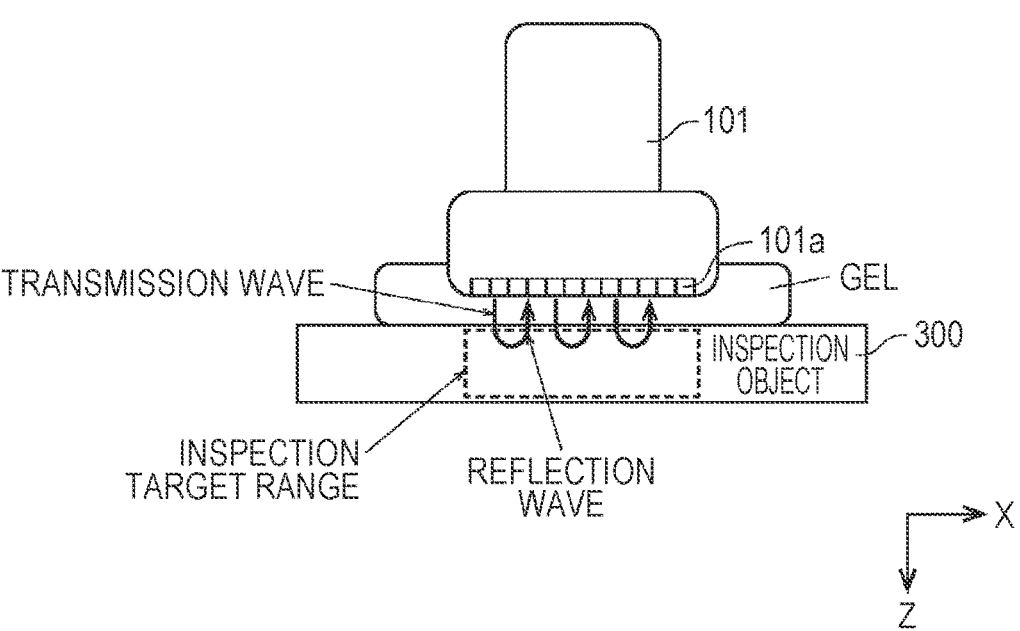
TRANSMISSION WAVE
101
101a
GEL
INSPECTION OBJECT
300
INSPECTION TARGET RANGE
REFLECTION WAVE
X
Z
FIG. 6B
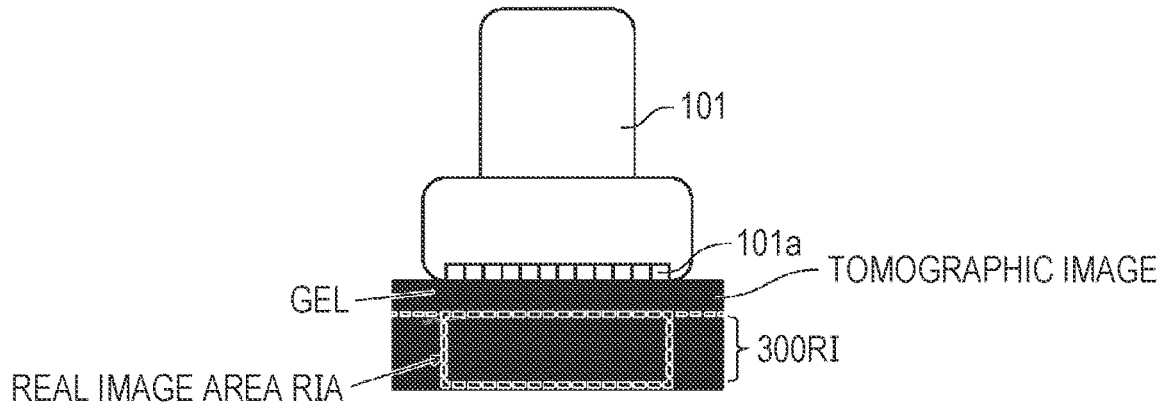
101
101a
TOMOGRAPHIC IMAGE
GEL
300RI
REAL IMAGE AREA RIA
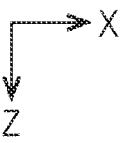
X
Z

MULTIPLE REFLECTION

101

101a

GEL

DEFECT DF

INSPECTION OBJECT

300

INSPECTION TARGET RANGE

DEEP PORTION

X

Z

101

101a

GEL

TOMOGRAPHIC IMAGE

REAL IMAGE AREA RIA

300RI

MULTIPLE REFLECTION AREA MRA
(VIRTUAL IMAGE AREA VIA)

MULTIPLE REFLECTION IMAGE MRI

X

Z

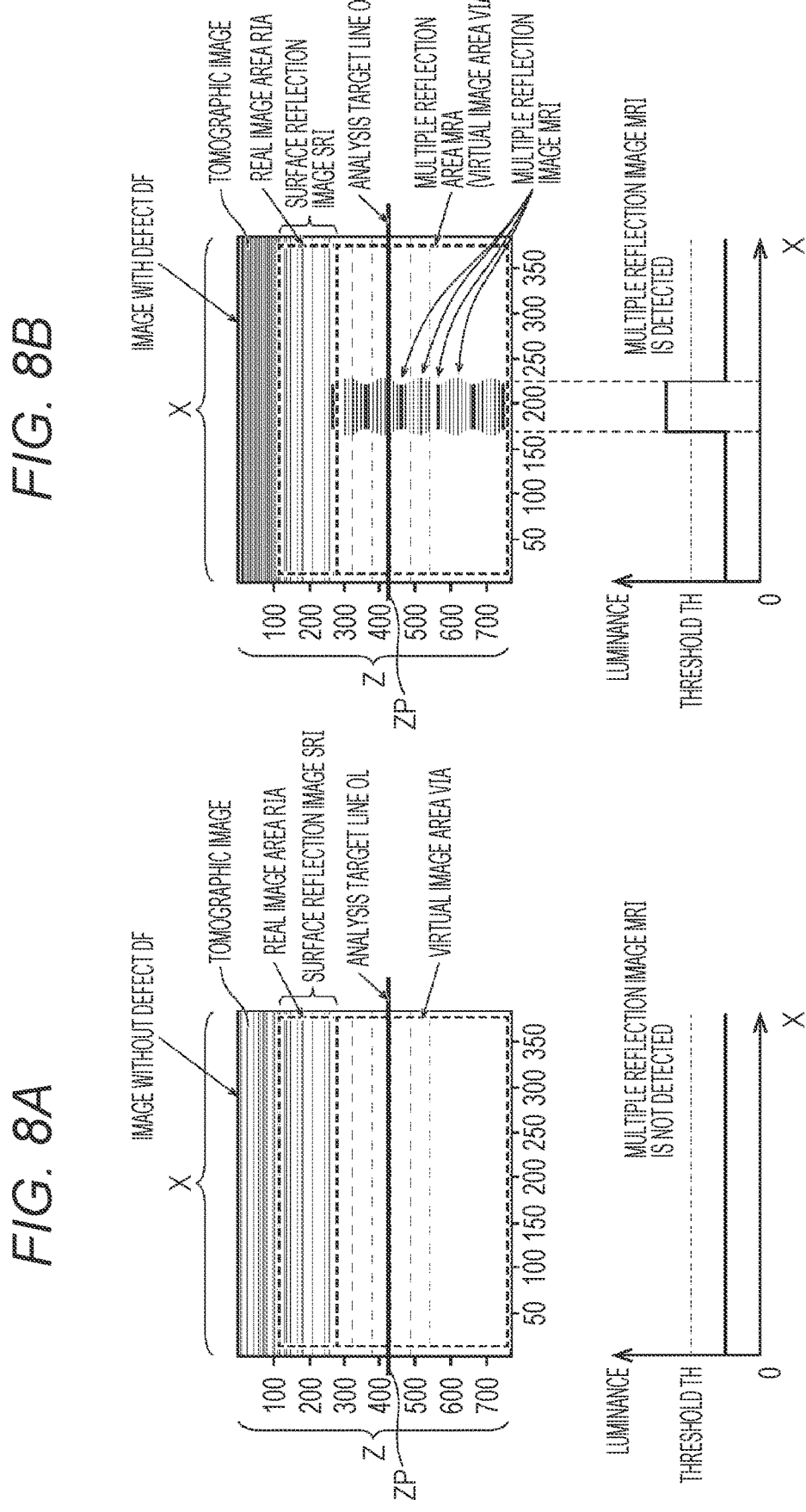

PLANAR CROSS-SECTIONAL
IMAGE RECONSTRUCTED ONLY
WITH MULTIPLE REFLECTION
IMAGE CORRESPONDING
PRINCIPAL COMPONENT

MULTIPLE REFLECTION IMAGE MRI
IS DETECTED

PLANAR CROSS-SECTIONAL
IMAGE RECONSTRUCTED ONLY
WITH MULTIPLE REFLECTION
IMAGE NOT CORRESPONDING
PRINCIPAL COMPONENT

*FIG. 17*

WAVE MOTION ANALYSIS DEVICE, SCANNING DEVICE, WAVE MOTION ANALYSIS SYSTEM, WAVE MOTION ANALYSIS METHOD, AND PROGRAM

TECHNICAL FIELD

The present disclosure relates to a wave motion analysis device, a scanning device, and a method thereof, and more particularly, to a method of detecting defects such as foreign matters and peeling using multiple reflection.

BACKGROUND ART

In recent years, an ultrasonic scanning method has been used for non-destructive inspection of a structure. An ultrasonic scanning method is a method in which an ultrasonic wave is transmitted from a probe (ultrasonic probe) into an inspection object, a reflection wave of the ultrasonic wave generated from a difference in acoustic impedance in the inspection object structure is received, and an ultrasonic tomographic image showing a state of the inside of the inspection object is generated on the basis of an obtained electric signal and inspected (for example, Non Patent Literature 1). For the purpose of detecting a defect around a welded portion of a structure or a defect on a surface or inside of an integrally molded structure, a large-scale ancillary device such as shielding is unnecessary as compared with a radiation transmission test, and therefore, the ultrasonic scanning method has been proposed as a material evaluation method. For example, Patent Literature 1 proposes a technique for performing ultrasonic inspection by removing noise due to multiple echoes generated in the inside of a rotation body of an ultrasonic probe from a received ultrasonic signal.

CITATION LIST

Non Patent Literature

Non Patent Literature 1: Masayasu Ito, Tsuyoshi Mochizuki, "Ultrasonic Diagnostic Apparatus", published by Corona Publishing Co., Ltd., Aug. 26, 2002

PATENT LITERATURE

Patent Literature 1: Japanese Patent Application Laid-Open No. 2010-175519

SUMMARY OF INVENTION

Technical Problem

Composite materials represented by CFRP (Carbon Fiber Reinforced Plastics) are expected to grow to achieve both strength and weight reduction. However, CFRP is not easy to process as compared with metal or the like, and has a characteristic that peeling or voids are generated inside, or the strength variation is large due to the degree of unevenness of the orientation of the filler, and there is a demand for a scanning method for visualizing the internal state of a material or a member and inspecting functional performance of the material or the member in order to guarantee the quality of the strength.

However, for example, a composite material such as CFRP often has a layer structure in which thin plate-shaped members are laminated, and in adhesion/bonding failure of members and quality evaluation of surface coating, defects such as peeling and foreign matters to be inspected are often located in a shallow portion of the member to be inspected. Therefore, when these defects are detected using the ultrasonic scanning method, there is a problem that it is difficult to accurately detect the defect since the reflection signal from the defect is buried in the specular reflection component such as surface reflection having a high signal intensity in the shallow portion, and the signal from the defect cannot be accurately identified.

In addition, in a case where the inspection target is a defect such as interlayer adhesion/bonding failure in a thin plate material forming a layer structure, peeling, foreign matters, or voids in surface coating, a defect substantially perpendicular to the incident direction of the beam is a strong reflector, and thus a virtual image (artifact) due to multiple reflection occurs, which makes it difficult to perform more accurate measurement. Conventionally, as described in Patent Literature 1, for example, it has been a technical common sense that the artifact due to multiple reflection is removed as noise that hinders inspection.

The present disclosure has been made in view of the above problems, and an object of the present disclosure is to provide a wave motion analysis device, a scanning device, a wave motion analysis system, a wave motion analysis method, and a program capable of detecting a defect located in a shallow portion of an inspection object member even when surface reflection is present.

Solution to Problem

A wave motion analysis device according to an aspect of the present disclosure is a wave motion analysis device that detects a defect of an inspection object on the basis of a reflection wave obtained from the inspection object, the wave motion analysis device including: a multiple reflection area extraction unit that acquires tomographic data generated on the basis of the reflection wave and extracts a multiple reflection area from the tomographic data; and a detection unit that detects a multiple reflection image corresponding to the defect of the inspection object from the extracted multiple reflection area.

Advantageous Effects of Invention

According to an aspect of the present disclosure, it is possible to provide a wave motion analysis device, a scanning device, a wave motion analysis system, a wave motion analysis method, and a program capable of detecting a defect located in a shallow portion of an inspection object member even when surface reflection is present.

BRIEF DESCRIPTION OF DRAWINGS

FIG. 1 is a functional block diagram illustrating a configuration of an ultrasonic scanning device 100 constituting an ultrasonic scanning device set 1000 according to a first embodiment.

FIGS. 4A and 4B are schematic diagrams illustrating an outline of operations in transmission and reception beamforming in the ultrasonic scanning device 100.

FIGS. 6A and 6B are schematic diagrams for explaining the operation of the multiple reflection area extraction unit 106 in a case where a defect DF of an inspection object 300 is not included.

FIG. 8A is a view schematically illustrating an example of a display image drawn on a display unit 111 in an embodiment of the scanning device 100 in a case where the defect DF of the inspection object 300 is not included, and FIG. 8B is a view schematically illustrating an example of a display image drawn on the display unit 111 in a case where the defect DF parallel to the surface is included in the inspection object 300.

FIGS. 11A and 11B are views schematically illustrating an example of a display image drawn on the display unit 111 in the embodiment of the ultrasonic scanning device 100A.

FIG. 17 is a schematic configuration diagram of an ultrasonic scanning system 1 according to the embodiment.

DESCRIPTION OF EMBODIMENTS

Hereinafter, an ultrasonic scanning method according to a first embodiment and an ultrasonic scanning device using the same will be described in detail with reference to the drawings.

First Embodiment

Hereinafter, an ultrasonic scanning device 100 according to a first embodiment will be described with reference to the drawings.

Figure 1:
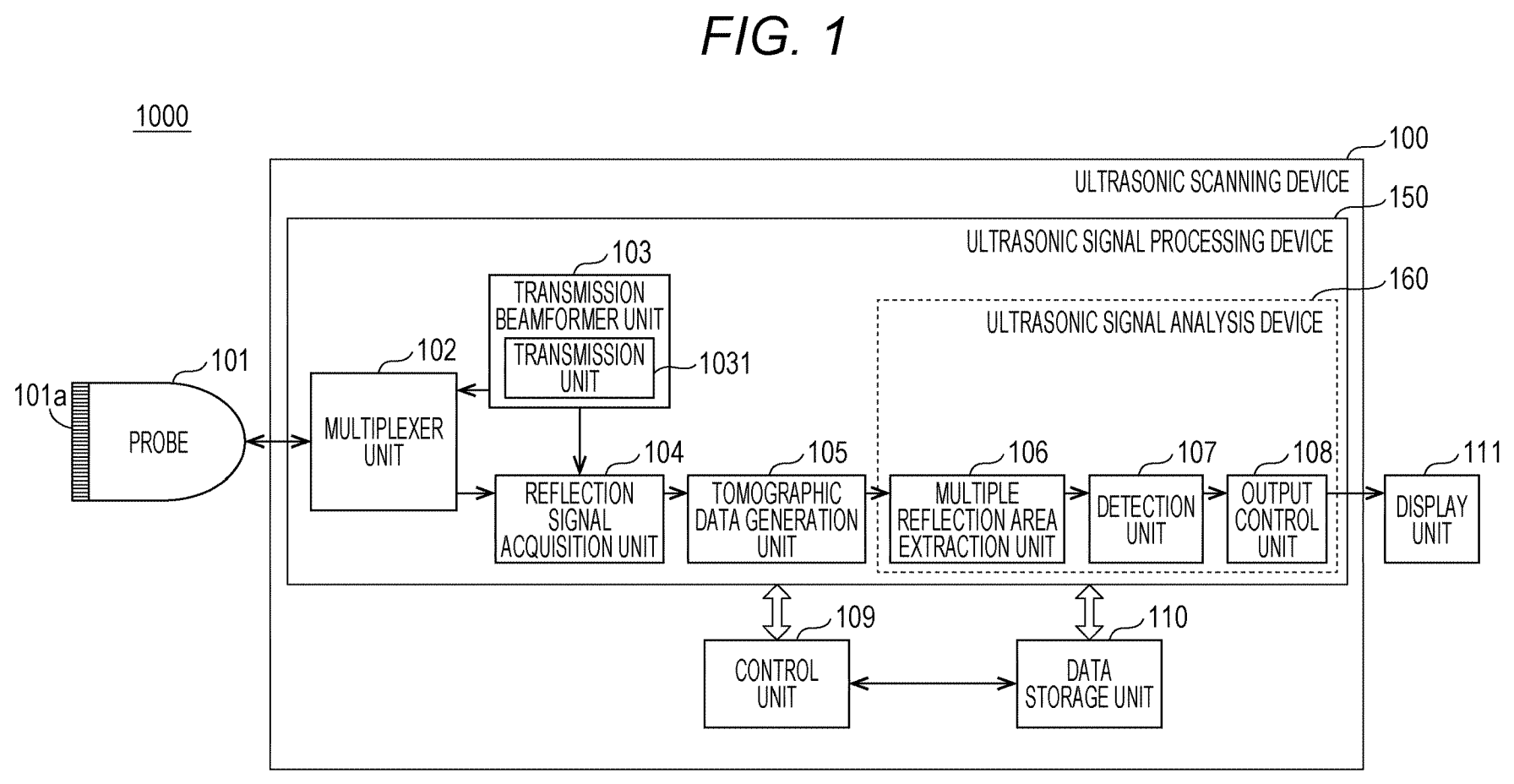

FIG. 1 is a functional block diagram of an ultrasonic scanning device set 1000 according to the first embodiment. As illustrated in FIG. 1, the ultrasonic scanning device set 1000 includes a probe 101 (ultrasonic probe) having a plurality of vibrators 101a that transmit ultrasonic waves toward an inspection object and receive reflection of the ultrasonic waves, an ultrasonic scanning device 100 that causes the probe 101 to transmit and receive ultrasonic waves and generates image data on the basis of an output signal from the probe 101, and a display unit 111 that displays an ultrasonic image on a screen. Each of the probe 101 and the display unit 111 is configured to be connectable to the ultrasonic scanning device 100. FIG. 1 illustrates a state in which the probe 101 and the display unit 111 are connected to an ultrasonic scanning device 100. Note that the probe 101 and the display unit 111 may be inside the ultrasonic scanning device 100.

Figure 2:
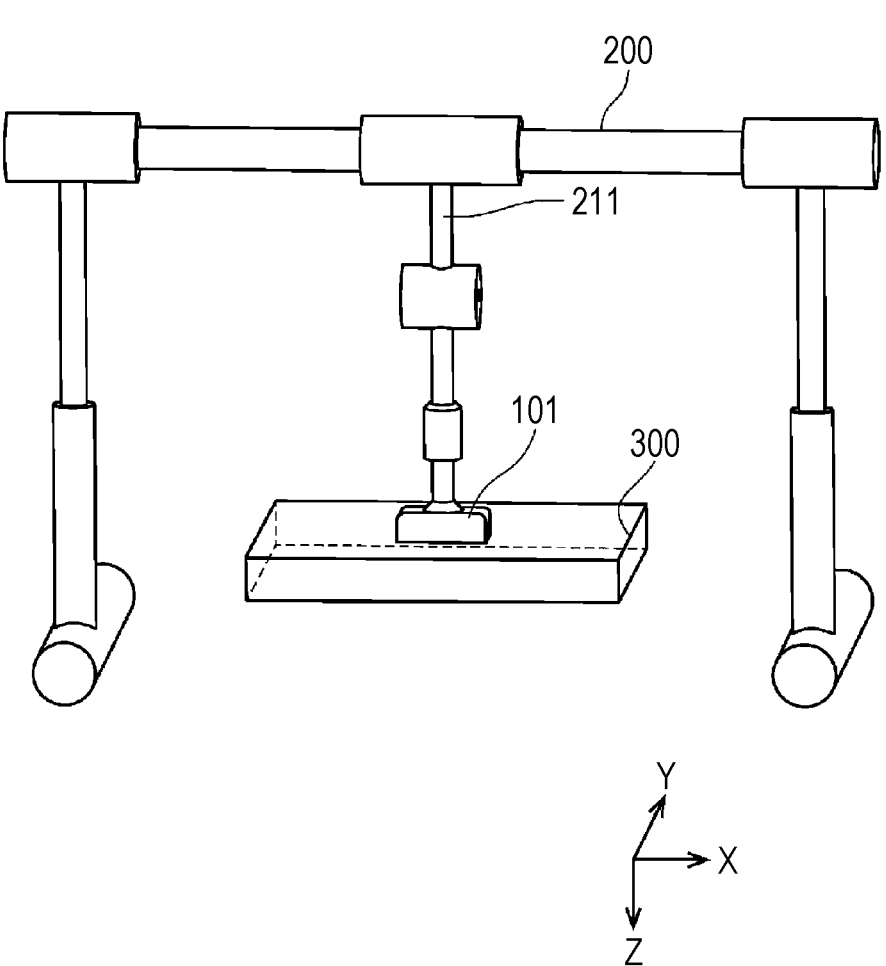
FIG. 2 is a schematic view illustrating a use state of the ultrasonic scanning device set 1000.

FIG. 2 is a schematic diagram illustrating a relationship between the ultrasonic scanning device 100 and an inspection object 300.

The inspection object 300 is a plate-shaped member. For example, it may be made of a composite material such as CFRP. Composite materials represented by CFRP are useful for achieving both strength and weight reduction. In order to reduce the weight of various mobility and devices for a low-carbon society, as structural members used for space probes, artificial satellites, wind power generation facilities, and the like, transition from metal materials such as iron to light metals, further carbon fiber-reinforced plastic materials, multi-materials obtained by bonding and joining them in combination, and the like has been advanced.

As illustrated in FIG. 2, the probe 101 is held by a holding member 211 connected to a housing 220. The inspection object 300 is disposed parallel to the vibrator surface of the probe 101. The holding member 211 has at least a function of adjusting the orientation of the probe 101 in the short axis direction of the probe 101 and holding the probe 101 in a desired orientation.

The inspection object 300 is, for example, a structural member having a layer structure in which a composite member such as an FRP cast molded product, a composite material, a metal or a resin, a multi-material obtained by bonding and joining them, or a thin plate-shaped member is laminated, but is not limited thereto.

At the time of measurement, the probe 101 is held by the holding member 211 in a state where at least the entire vibrator surface is away from and close to the surface of the inspection object 300 by a minute distance, and for example, an ultrasonic gel (not illustrated) is filled between the surface of the inspection object 300 and the vibrator surface of the probe 101.

<Configuration of Ultrasonic Scanning Device 100>

The ultrasonic scanning device 100 includes a multiplexer unit 102 that selects a vibrator to be used at the time of transmission or reception from among the plurality of vibrators 101a of the probe 101 and secures input/output with respect to the selected vibrator, a transmission beamformer unit 103 that controls a timing of applying a high voltage to each vibrator 101a of the probe 101 in order to transmit an ultrasonic wave, and a reflection signal acquisition unit 104 that amplifies an electric signal obtained by the plurality of vibrators 101a on the basis of a reflection wave of the ultrasonic wave received by the probe 101, performs A/D conversion, and performs reception beamforming to generate an acoustic line signal. The tomographic imaging apparatus also includes a tomographic data generation unit 105 that generates tomographic data on the basis of an output signal from the reflection signal acquisition unit 104, a multiple reflection area extraction unit 106 that extracts a predetermined data area that can be an analysis target from the tomographic data, a detection unit 107 that specifies the analysis target data from the extracted data area and analyzes the analysis target data to determine the presence or absence of a defect, an output control unit 108 that generates a display image indicating a determination result, a data storage unit 110 that stores an acoustic line signal output from the reflection signal acquisition unit 104 and tomographic data output from the tomographic data generation unit 105, and a control unit 109 that controls each component.

Among them, the multiplexer unit 102, the transmission beamformer unit 103, the reflection signal acquisition unit 104, the tomographic data generation unit 105, the multiple reflection area extraction unit 106, the detection unit 107, and the output control unit 108 constitute an ultrasonic signal processing device 150. In addition, the multiple reflection area extraction unit 106, the detection unit 107, and the output control unit 108 constitute an ultrasonic signal analysis device 160.

Each element constituting the ultrasonic scanning device 100, for example, the multiplexer unit 102, the transmission beamformer unit 103, the reflection signal acquisition unit 104, the tomographic data generation unit 105, and the control unit 109 is realized by a hardware circuit such as a field programmable gate array (FPGA) or an application specific integrated circuit (ASIC). Alternatively, the configuration may be realized by a programmable device such as a processor and software. A central processing unit (CPU) or a graphics processing unit (GPU) can be used as the processor, and a configuration using the GPU is called as a General-Purpose computing on Graphics Processing Unit (GPGPU). These components can be one circuit component, or can be an assembly of a plurality of circuit components. In addition, a plurality of components can be combined to form one circuit component, or can be an assembly of a plurality of circuit components.

The data storage unit 110 is a computer-readable recording medium, and for example, a flexible disk, a hard disk, an MO, a DVD, a DVD-RAM, a BD, a semiconductor memory, or the like can be used. Furthermore, the data storage unit 110 may be a storage device externally connected to the ultrasonic scanning device 100.

Note that the ultrasonic scanning device 100 according to the first embodiment is not limited to the ultrasonic scanning device having the configuration illustrated in FIG. 1. For example, the multiplexer unit 102 may not be provided, and the transmission beamformer unit 103 and the reflection signal acquisition unit 104 may be directly connected to each vibrator 101a of the probe 101. In addition, the probe 101 may have a configuration in which the transmission beamformer unit 103, the reflection signal acquisition unit 104, a part thereof, or the like is incorporated. This is not limited to the ultrasonic scanning device 100 according to the first embodiment, and the same applies to an ultrasonic scanning device according to a modification described later.

<Configuration of Ultrasonic Scanning Device 100>

Hereinafter, the transmission beamformer unit 103, the reflection signal acquisition unit 104, the tomographic data generation unit 105, the multiple reflection area extraction unit 106, the detection unit 107, and the output control unit 108 of the ultrasonic scanning device 100 will be described.

(Transmission Beamformer Unit 103)

The transmission beamformer unit 103 is connected to the probe 101 via the multiplexer unit 102, and controls a timing of applying a high voltage to a transmission vibrator corresponding to all or a part of the plurality of vibrators 101a existing in the probe 101 in order to transmit an ultrasonic wave from the probe 101. The transmission beamformer unit 103 includes a transmission unit 1031.

The transmission unit 1031 performs transmission processing of supplying a pulsed transmission signal for causing the transmission vibrator Tx to transmit an ultrasonic beam among the plurality of vibrators 101a existing in the probe 101 on the basis of the transmission control signal from the control unit 109.

The transmission unit 1031 may be driven for each single transmission vibrator to generate the ultrasonic beam from the single vibrator. Alternatively, it may be configured to drive a plurality of transmission vibrators in parallel. In the transmission processing, the transmission timing of the ultrasonic beam may be set to a delay time for each vibrator, and the transmission of the ultrasonic beam may be delayed by the delay time to form a wavefront of a desired shape, and focusing of the ultrasonic beam may be performed. The number of transmission vibrators to be driven in parallel can be arbitrarily set for the vibrators 101a present in the probe 101, for example. In the present specification, ultrasonic transmission performed in parallel is referred to as a "transmission event".

FIG. 4A is a schematic diagram illustrating an outline of an operation in transmission beamforming in the ultrasonic scanning device 100. As illustrated in FIG. 4A a transmission wave is transmitted vertically downward from the plurality of transmission vibrators Tx in one transmission event. Further, the transmission unit 1031 repeats the ultrasonic wave transmission while gradually moving the transmission vibrator Tx in an array direction for each transmission event, and performs the ultrasonic wave transmission from all the vibrators 101a existing in the probe 101.

(Reflection Signal Acquisition Unit 104)

Figure 3:
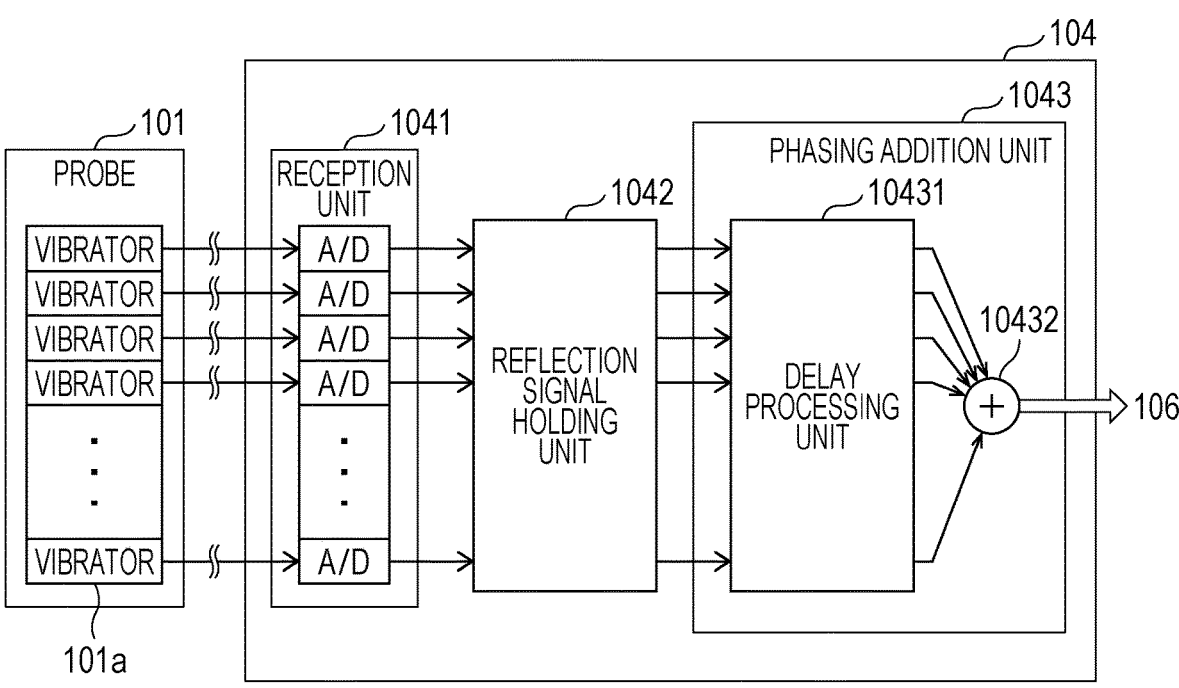
FIG. 3 is a functional block diagram illustrating a configuration of a reflection signal acquisition unit 104 in the ultrasonic scanning device 100.

The reflection signal acquisition unit 104 generates an acoustic line signal from the electric signals obtained by the plurality of vibrators 101a on the basis of the reflection wave of the ultrasonic wave received by the probe 101. The "acoustic line signal" is a reflection signal after phasing addition processing is performed. The phasing addition process will be described later. FIG. 3 is a functional block diagram illustrating a configuration of the reflection signal acquisition unit 104. As illustrated in FIG. 3, the reflection signal acquisition unit 104 includes a reception unit 1041, a reflection signal holding unit 1042, and a phasing addition unit 1043.

Hereinafter, a configuration of each unit constituting the reflection signal acquisition unit 104 will be described.

The reception unit 1041 is a circuit that is connected to the probe 101 via the multiplexer unit 102, amplifies an electric signal obtained by receiving an ultrasonic reflection wave in the probe 101 in synchronization with a transmission event, and then generates a reflection signal (RF signal) subjected to AD conversion. The reflection signal is generated in time series in the order of the transmission event and output to the reflection signal holding unit 1042, and the reflection signal holding unit 1042 holds the reflection signal. Here, the reflection signal (RF signal) is a digital signal obtained by A/D converting the electric signal converted from the reflected ultrasonic wave received by each vibrator, and forms a train of signals connected in a transmission direction (depth direction of the inspection object) of the ultrasonic wave received by each vibrator.

FIG. 4B is a schematic diagram illustrating an outline of an operation in reception beamforming in the reflection signal acquisition unit 104, and illustrates an operation of generating an RF signal train based on a reflected ultrasonic wave from an observation point P which is an arbitrary virtual point. The reception unit 1041 generates a train of the reflection signals RF for each of the reception vibrators Rw on the basis of the reflected ultrasonic wave obtained by each of the reception vibrators Rw arranged in an array corresponding to a part or all of the vibrators 101a of the plurality of Nx existing in the probe 101 in synchronization with the transmission event. The reception vibrator Rw is selected by the control unit 109 via the multiplexer unit 102. In the first embodiment, the array center of the array Rwx of the reflection vibrator Rw configured by the reception vibrator Rw is selected so as to coincide with the array center of the transmission vibrator Tx. The number Mx of the reception vibrators Rw may be set to be larger than the number of transmission vibrators, or may be the total number Nx of the vibrators 101a present in the probe 101.

The transmission unit 1031 repeats the ultrasonic wave transmission while gradually moving the transmission vibrator Tx in the array direction for each transmission event, and the reception unit 1041 generates a train of the reflection signal RF for the reception vibrator Rw for each transmission event, and the train of the reflection signal RF is stored in the reflection signal holding unit 1042.

The reflection signal holding unit 1042 is a computer-readable recording medium, and for example, a semiconductor memory or the like can be used. The reflection signal holding unit 1042 inputs a train of reflection signals for each reception vibrator from the transmission unit 1031 in synchronization with the transmission event, and holds the train until phasing addition processing is performed. Furthermore, the reflection signal holding unit 1042 may be a part of a storage device externally connected to the ultrasonic scanning device 100 or the data storage unit 110 incorporated in the ultrasonic scanning device 100.

The phasing addition unit 1043 is a circuit that generates an acoustic line signal by phasing and adding the reflection signal trains received by the respective reflection vibrators from the observation points P for the plurality of observation points P defined in the calculation target area Bx in the inspection object in synchronization with the transmission event. The "calculation target area" is an area in which an acoustic line signal is generated in synchronization with one transmission event. As illustrated in FIG. 6B, the calculation target area Bx may be a linear area corresponding to a single vibrator in the azimuth direction. In this case, one continuous acoustic line signal including signals for a plurality of observation points P arranged in the linear area is generated by phasing addition of the reflection signal trains received by the respective reception vibrators. Alternatively, the calculation target area Bx may be an area having a predetermined width corresponding to a plurality of vibrators in the azimuth direction. In this case, the calculation target areas Bx set for each transmission event overlap each other in the azimuth direction, and signals of overlapping portions are synthesized in a synthesis unit 10433 to be described later. That is, the acoustic line signal of one frame is generated by synthesizing the acoustic line signals at the observation points P in the plurality of calculation target areas Bx generated in synchronization with the plurality of transmission events. The "frame" refers to a unit that forms one collective signal necessary for constructing one ultrasound tomographic image. The calculation target area Bx in which the acoustic line signal is generated in synchronization with the transmission event may be, for example, a linear area that passes through the array center of the reception aperture Rx, is perpendicular to the vibrator array, and has a single vibrator width. However, the calculation target area Bx is not limited to this, and may be set to any area.

As illustrated in FIG. 3, the phasing addition unit 1043 includes a delay processing unit 10431, an addition unit 10432, and the synthesis unit 10433. Hereinafter, the configuration of each unit will be described.

The delay processing unit 10431 is a circuit that identifies a reflection signal corresponding to a delay amount with respect to each of the reception vibrators Rw as a reflection signal corresponding to each of the reception vibrators Rw on the basis of a reflected ultrasonic wave from the observation point P from a train of reflection signals RF with respect to the reception vibrator Rw.

In synchronization with the transmission of the ultrasonic beam, the delay processing unit 10431 calculates a delay amount to be applied to a train of reflection signals for each of the reception vibrators Rw on the basis of the information indicating the position of the observation point P, acquires a reflection signal corresponding to the reception vibrator Rw from the reflection signal holding unit 1042, identifies a reflection signal corresponding to a time obtained by subtracting the delay amount for each of the reception vibrators Rw from a train of reflection signals RF corresponding to each of the reception vibrators Rw as a reflection signal based on a reflection wave from the observation point P, and outputs the reflection signal to the addition unit 10432. The delay amount to be applied is calculated on the basis of the distance between the vibrator positioned on the central axis of the transmission ultrasonic beam and each vibrator 101a.

The addition unit 10432 is a circuit that receives the reflection signals identified corresponding to the reception vibrators Rw output from the delay processing unit 10431 as inputs, adds the input signals, and generates an acoustic line signal subjected to phasing addition with respect to the observation point P. Alternatively, the acoustic line signal for the observation point P may be generated by multiplying the reflection signal identified corresponding to each reception vibrator Rw by the reception apodization for each reception vibrator Rw and adding the results.

It is possible to generate the acoustic line signals for all the observation points P in the calculation target area Bx from one transmission event and the processing accompanying the transmission event. Then, while gradually moving the transmission vibrator Tx in the array direction for each transmission event, ultrasonic transmission is repeated from all the vibrators 101a existing in the probe 101, and the acoustic line signal of the calculation target area Bx generated for each transmission event is gradually output to the tomographic data generation unit 105 for each transmission event.

Furthermore, in a configuration in which the calculation target areas Bx set for each transmission event overlap each other in the azimuth direction, a synthesis unit (not illustrated) that synthesizes a frame acoustic line signal from an acoustic line signal of the calculation target area Bx generated in synchronization with the transmission event may be provided at a subsequent stage of the addition unit 10432. The synthesis unit gradually inputs the acoustic line signals generated for the plurality of observation points P in the calculation target area Bx from the addition unit 10432 in synchronization with the transmission event, and superimposes the acoustic line signals for the respective observation points P using the position of the observation point P at which the acoustic line signal is acquired as an index to synthesize the frame acoustic line signal. As described above, ultrasonic wave transmission is sequentially performed by gradually differentiating the transmission vibrator Tx in the vibrator array direction in synchronization with the transmission event. Therefore, the positions of the calculation target areas Bx based on different transmission events are gradually different in the same direction for each transmission event. The frame acoustic line signals covering all the calculation target areas Bx are synthesized by overlapping the positions of the observation points P at which the acoustic line signals are acquired as indices. The synthesized acoustic line signal of one frame is output to the tomographic data generation unit 105.

(Tomographic Data Generation Unit 105)

Figure 5:
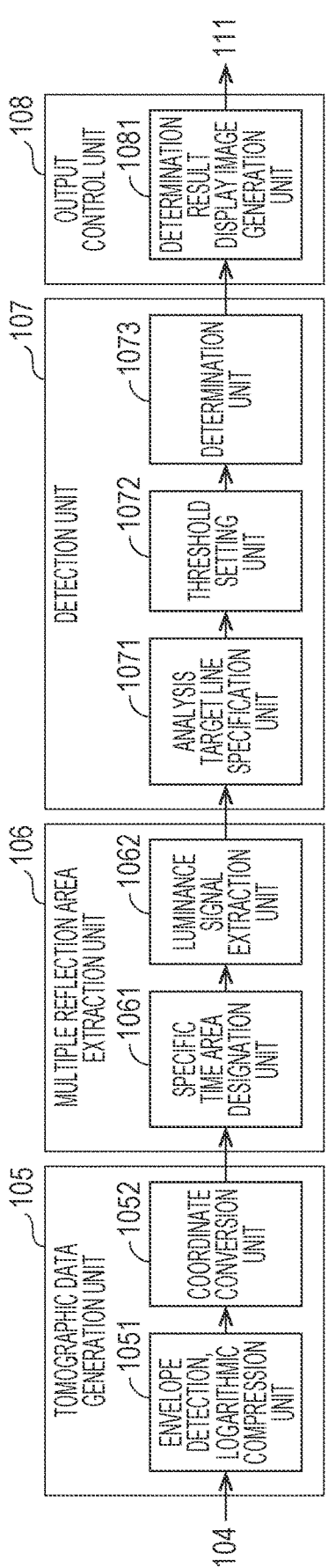
FIG. 5 is a functional block diagram illustrating configurations of a tomographic data generation unit 105, a multiple reflection area extraction unit 106, a detection unit 107, and an output control unit 108 in the ultrasonic scanning device 100.

The tomographic data generation unit 105 acquires the acoustic line signal output from the phasing addition unit 1043, performs conversion into a luminance value and coordinate conversion into an orthogonal coordinate system, and converts the acoustic line signal into tomographic data (tomographic image). FIG. 5 is a functional block diagram illustrating configurations of the tomographic data generation unit 105, the multiple reflection area extraction unit 106, the detection unit 107, and the output control unit 108.

The tomographic data generation unit 105 includes an envelope detection, logarithmic compression unit 1051, and a coordinate conversion unit 1052. The conversion into the luminance value is performed by performing envelope detection on the acoustic line signal to remove the frequency component of the transmission ultrasonic wave, and performing logarithmic compression to improve the contrast of the ultrasonic tomographic image.

The coordinate transformation into the orthogonal coordinate system is performed, for example, by transforming information indicating the position of the observation point P represented by the arrangement direction of the vibrators 101a and the time direction of the reflection signal into XZ coordinates corresponding to the lateral direction and the depth of the cross section of the inspection object.

The tomographic data generation unit 105 repeats the above processing for each transmission event, generates tomographic data of one frame on the basis of an acoustic line signal of one frame, and outputs the tomographic data to the multiple reflection area extraction unit 106.

(Multiple Reflection Area Extraction Unit 106)

The multiple reflection area extraction unit 106 extracts, from the acquired tomographic data, a multiple reflection area corresponding to a depth range deeper than a depth at which a real image of the inspection object can be detected and capable of mainly detecting a multiple reflection signal as a data area that can be an analysis target. The multiple reflection area extraction unit 106 includes a specific time area designation unit 1061 and a luminance signal extraction unit 1062.

FIGS. 6A and 6B, schematic diagrams for explaining the operation of the multiple reflection area extraction unit 106.

As illustrated in FIG. 6A, in a state where the vibrator array 101a of the probe 101 faces the surface of the inspection object 300 with the gel interposed therebetween, when the vibrator array 101a of the probe 101 is driven to irradiate the inspection target range of the inspection object 300 with the ultrasonic beam from the vibrator array 101a, the reflection wave from the inspection target range enters the vibrator array 101a, and tomographic data is obtained on the basis of the reflection signal.

Then, in the image based on the tomographic data, as illustrated in FIG. 6B, a tomographic image 300 RI based on the reflection signal obtained from the inspection target range of the inspection object 300 is displayed. In the present specification, a data portion in tomographic data corresponding to the inspection target range of the inspection object 300 is defined as a real image area RIA.

Figure 7A:
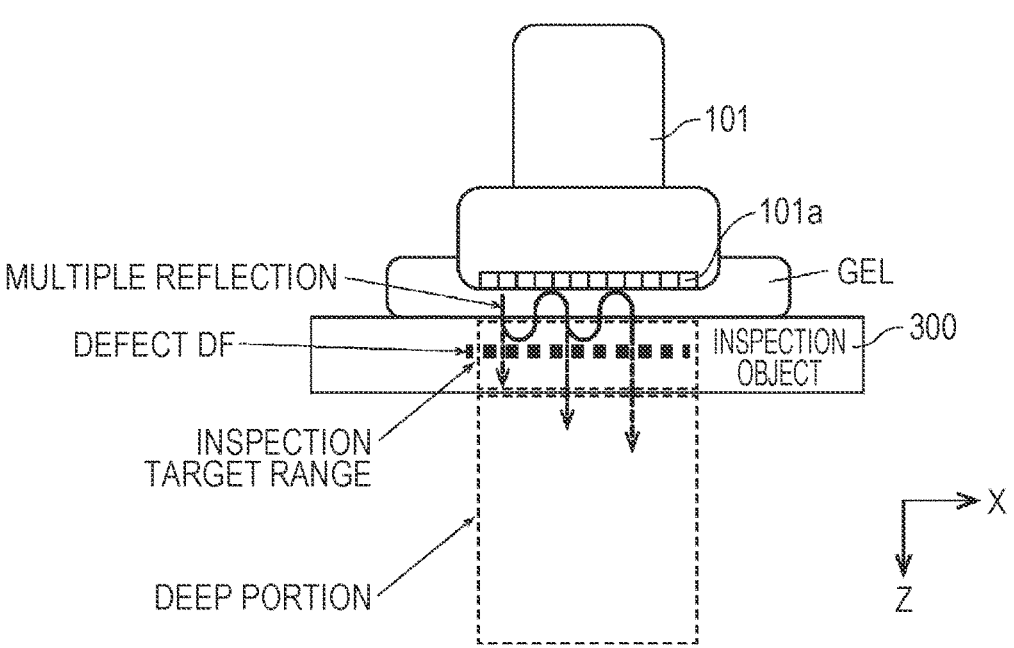
FIGS. 7A and 7B are schematic diagrams for explaining the operation of the multiple reflection area extraction unit 106 in a case where a defect DF is included in the inspection object 300.
Figure 7B:
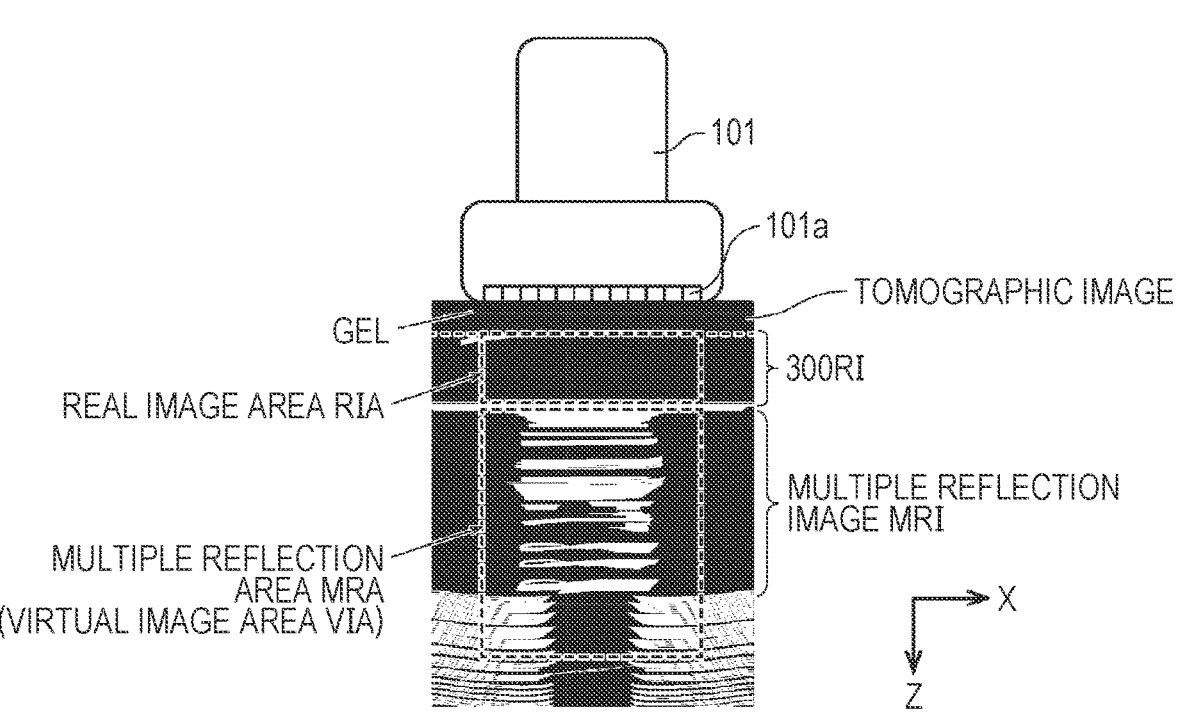

FIGS. 7A and 7B, the schematic diagrams for explaining the operation of the multiple reflection area extraction unit 106 in a case where a defect such as peeling or foreign matter to be inspected exists in the inspection object 300.

When the inspection object 300 is a member having a layer structure in which a composite material such as CFRP is laminated with a thin plate-shaped member, for example, a defect DF such as peeling, foreign matters, or voids to be inspected is often a layer defect parallel to the surface of the inspection object 300 in adhesion/joining of members or evaluation of quality of surface coating. When an ultrasonic beam is transmitted from the vibrator array 101a of the probe 101 to the inspection object 300 including such a defect, as illustrated in FIG. 7A, the ultrasonic beam is incident substantially perpendicularly to the defect DF, so that the defect DF becomes a strong reflector. Then, a reflection wave having high intensity enters the vibrator array 101a, and multiple reflection that repeats reflection between the vibrator array 101a and the defect DF occurs.

In this case, in the image based on the tomographic data, as illustrated in FIG. 7B, the tomographic image 300 RI based on the reflection wave from the inspection target range of the inspection object 300 is displayed in the real image area RIA, and the multiple reflection image MRI is displayed as a band-shaped high luminance area including a plurality of high luminance lines extending in the X direction arranged at a predetermined pitch in the depth direction in an area corresponding to a depth range deeper than the inspection target range of the inspection object and extending in the Z direction.

In the present specification, a data portion in tomographic data which corresponds to a depth range deeper than the inspection target range of the inspection object 300 and in which the multiple reflection signal is mainly easily detected is defined as a multiple reflection area MRA (virtual image area VIA).

A virtual image (artifact) due to multiple reflection may hinder accurate measurement, and conventionally, for example, Patent Literature 1 proposes a technique of removing noise due to multiple reflection echoes from a received ultrasonic signal by a filter as an object to be removed. That is, conventionally, it has been a technical common sense that artifacts due to multiple reflection are removed as noise that hinders inspection, for example, as described in Patent Literature 1.

In contrast, in the multiple reflection area extraction unit 106 according to the present disclosure, the specific time area designation unit 1061 designates, as the specific time area, a time area that is equal to or longer than the time in which the reflection wave from the inspection target range of the inspection object 300 reaches and has a predetermined length, specifies, as the multiple reflection area MRA, an area where image data based on the reflection signal obtained in the specific time area exists in the tomographic data, and mainly uses the signal from the multiple reflection area MRA as the analysis target signal for defect DF detection. Therefore, the specific time area may be set to be equal to or longer than the time when the ultrasonic wave reaches from the depth of the inspection target range of the inspection object 300. When the thickness of the inspection object 300 is predetermined, a value preset in the specific time area designation unit 1061 may be used as the specific time area. Alternatively, it may be configured such that the operator inputs the specific time area on the basis of the inspection target range of the inspection object 300 drawn in the real image area RIA.

The luminance signal extraction unit 1062 extracts the luminance signal of the multiple reflection area MRA from the tomographic data and outputs the luminance signal to the detection unit 107.

(Detection Unit 107)

The detection unit 107 selects and analyzes the analysis target image data OL from the tomographic data of the multiple reflection area MRA, and detects the multiple reflection image MRI corresponding to the defect DL of the inspection object 300. The detection unit 107 includes an analysis target line specification unit 1071, a threshold setting unit 1072, and a determination unit 1073.

FIG. 8A is a view schematically illustrating an example of a display image drawn on a display unit 111 in an embodiment of the scanning device 100 in a case where the defect DF of the inspection object 300 is not included, and FIG. 8B is a view schematically illustrating an example of a display image drawn on the display unit 111 in a case where the defect DF parallel to the surface is included in the inspection object 300. The operation of the detection unit 107 will be described using this display image.

The analysis target line specification unit 1071 selects line data located at a predetermined depth ZP as the analysis target line OL from the tomographic data of the multiple reflection area MRA. A plurality of analysis target lines OL may be selected with different depths ZP.

Threshold setting unit 1072 sets luminance threshold TH. At this time, the luminance threshold TH may be determined on the basis of, for example, the average luminance of the tomographic data of the multiple reflection area MRA.

As illustrated in FIG. 8B, when there is a data portion exceeding the threshold luminance TH in a stepwise manner over a predetermined length or more in the line data of the analysis target line OL, the determination unit 1073 determines and detects the data portion as the multiple reflection image MRI indicating the defect DF of the inspection object 300. On the contrary, as illustrated in FIG. 8A, when there is no data portion exceeding the threshold luminance TH in a stepwise manner in the line data of the analysis target line OL, it is determined that there is no multiple reflection image MRI indicating the defect DF of the inspection object 300.

As a result, the analysis target line OL is selected from the multiple reflection area MRA located in the depth range deeper than the inspection target range of the inspection object 300, and the presence or absence of the multiple reflection image MRI indicating the defect DF of the inspection object 300 is detected. Therefore, as illustrated in FIGS. 8A and 8B, the defect DF of the inspection object 300 can be detected without being affected by the strong specular reflection component (high luminance portion) in the surface reflection image SRI in the real image area RIA corresponding to the inspection target range of the shallow portion of the inspection object 300.

(Output Control Unit 108)

The output control unit 108 includes a determination result display image generation unit 1081, and generates a display image indicating a determination result including, for example, an identification image indicating the presence or absence of the defect DF of the inspection object 300, character information, and the like, and outputs the display image to the display unit 111.

<Operation>

The operation of the ultrasonic scanning device 100 having the above configuration will be described.

Figure 9:
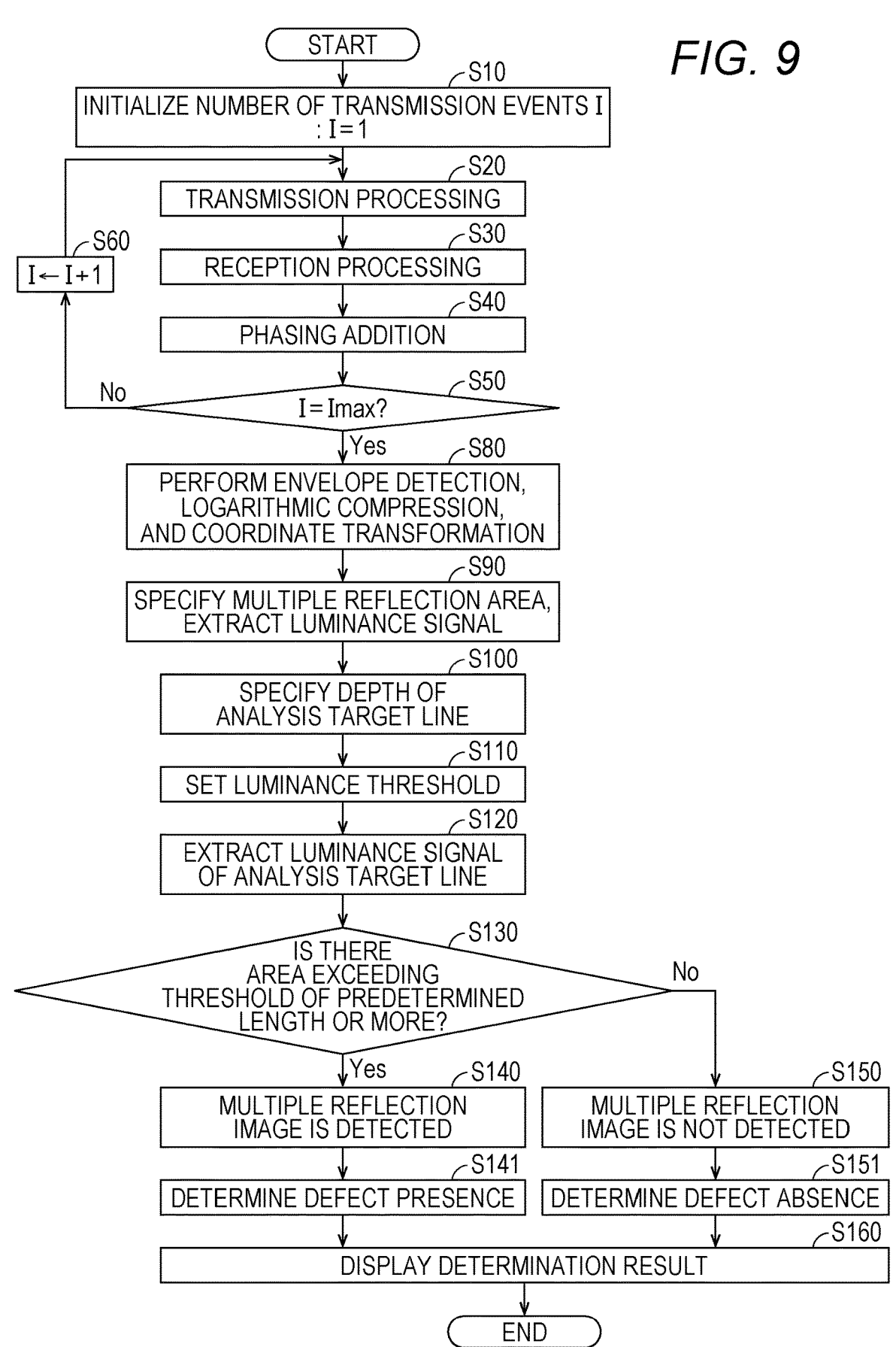
FIG. 9 is a flowchart illustrating an operation of the ultrasonic scanning device 100.

FIG. 9 is a flowchart illustrating an operation of the ultrasonic scanning device 100.

First, in step S10, the number of transmission events I is initialized, transmission processing is performed to transmit an ultrasonic beam from the transmission vibrator Tx of the probe 101 (step S20), reception processing is performed to generate a reflection signal on the basis of the reflection wave received by the wave reception vibrator array (step S30), and phasing addition is performed on the reflection signal to generate an acoustic line signal (step S40).

Next, it is determined whether or not the number of transmission events I is the maximum value (step S50). In a case where the number of transmission events I is not the maximum value (step S50: No), I is incremented (step S60), the processing returns to step S20, and the transmission vibrator Tx is gradually moved to perform the processing of step S20 to S40. In a case where the number of transmission events I is the maximum value (step S50: Yes), the generation of the acoustic line signal of one frame is completed, and the processing proceeds to step S80.

Next, in step S80, envelope detection, logarithmic compression, and coordinate transformation are performed on the acoustic line signal of one frame to generate tomographic data of one frame.

Next, the multiple reflection area MRA is specified from the tomographic data and the luminance signal is extracted (step S90), the depth ZP of the analysis target line is specified (step S100), the luminance threshold TH is set (step S110), and the luminance signal of the analysis target line OL is extracted (step S120).

Next, it is determined whether there is an area exceeding the luminance threshold of the predetermined length or more (step S130). In a case where there is an area exceeding the luminance threshold of the predetermined length or more (step S130: Yes), it is determined that the multiple reflection image MRI is detected (step S140) and there is a defect DF (step S141). In a case where there is no area exceeding the luminance threshold of the predetermined length or more (step S130: No), it is determined that the multiple reflection image MRI is not detected (step S150) and there is no defect DF (step S151), and the determination result is displayed on the display unit 111 (step S160), and the processing is ended.

SUMMARY

When the inspection object 300 is, for example, a member having a layer structure in which thin plate-shaped members are laminated, such as CFRP, defects such as peeling and foreign matters to be inspected are located in a shallow portion of the inspection object member in adhesion/bonding of members and evaluation of quality of surface coating. However, in the shallow portion, the influence of specular reflection components such as surface reflection having high signal intensity is strong, and the reflection wave from the defect is buried, so that there is a problem that the signal from the defect cannot be clearly specified, and it is difficult to accurately detect the defect. In addition, in a case where the inspection object is a defect such as interlayer adhesion/bonding failure in the thin plate material, peeling, foreign matters, or voids in the surface coating, a defect perpendicular to the incident direction becomes a strong reflector, and thus multiple reflection occurs, making it difficult to perform more accurate measurement.

Conventionally, as described in Patent Literature 1, for example, it has been a technical common sense that the artifact due to multiple reflection is removed as noise that hinders inspection.

In this regard, as a result of intensive studies, the inventors have attempted to solve the above-described problem by daring to use multiple reflection.

Specifically, the ultrasonic signal analysis device 160 according to the first embodiment is configured to extract, from the tomographic data, the multiple reflection area MRA that corresponds to the depth range deeper than the depth at which the real image of the inspection object 300 can be detected in the tomographic data and is mainly capable of detecting the multiple reflection signal, select and analyze the analysis target image data from the multiple reflection area MRA, and detect the multiple reflection image MRI corresponding to the defect DF of the inspection object 300.

With this configuration, the analysis target line OL is selected from the multiple reflection area MRA located in the depth range deeper than the inspection target range of the inspection object 300, and the defect DF of the inspection object 300 can be detected without being affected by strong specular reflection components such as surface reflection in the real image area RIA corresponding to the inspection target range of the shallow portion of the inspection object 300.

That is, the real image area RIA has a stronger specular reflection component than the multiple reflection area MRA, and it is difficult to accurately detect the defect DF. Therefore, the defect DF detection in which the signal in the real image area RIA is set as an analysis target avoided, and the signal from the multiple reflection area MRA in which the multiple reflection is visualized is mainly set as an analysis target, whereby the defect located in the shallow portion of the inspection target member can be accurately detected even when the surface reflection is present.

In addition, the analysis target image data is line data located at a predetermined depth, and in a case where there is a data portion exceeding the threshold luminance in a stepwise manner over a predetermined length or more in the line data, it is possible to select the analysis target line OL from the multiple reflection area MRA and detect the presence or absence of the multiple reflection image MRI indicating the defect DF of the inspection object 300 by adopting a configuration of determining the data portion as a multiple reflection image and detecting the data portion.

Second Embodiment

In the ultrasonic scanning device 100 according to the first embodiment, the multiple reflection area MRA corresponding to the depth range deeper than the depth at which the real image of the inspection object 300 can be detected is specified, and the detection unit 107 extracts line data located at a predetermined depth from the multiple reflection area MRA as the analysis target image data, and when there is a data portion exceeding the threshold luminance TH in a stepwise manner over a predetermined length or more in the line data, the data portion is determined as the multiple reflection image MRI. However, the method of detecting the analysis target image data and the multiple reflection image MRI is not limited thereto.

An ultrasonic scanning device 100A and its ultrasonic signal analysis device 160 according to the second embodiment differs from the first embodiment in that, planar cross-sectional image data in a planar direction of the inspection object corresponding to a specific depth included in the multiple reflection area MRA is selected as the analysis target image data, and for its spatial frequency, multiple reflection image MRI is detected by using principal component analysis (PCA). According to this method, even when there is surface reflection, it is possible to more accurately detect a defect located in the shallow portion of the inspection target member.

Hereinafter, an ultrasonic scanning device 100A according to the second embodiment will be described in detail with reference to the drawings.

<Configuration>

The ultrasonic scanning device 100A according to the second embodiment is different from the ultrasonic scanning device 100 according to the first embodiment in that tomographic data to be generated is three-dimensional voxel data and in an analysis method for detecting a multiple reflection image MRI, and the other configurations are the same as those of the ultrasonic scanning device 100 illustrated in FIG. 1. Therefore, generation of tomographic data and the method of detecting multiple reflection image MRI in the ultrasonic scanning device 100A will be outlined below, and description of other configurations will be omitted.

Figure 10:
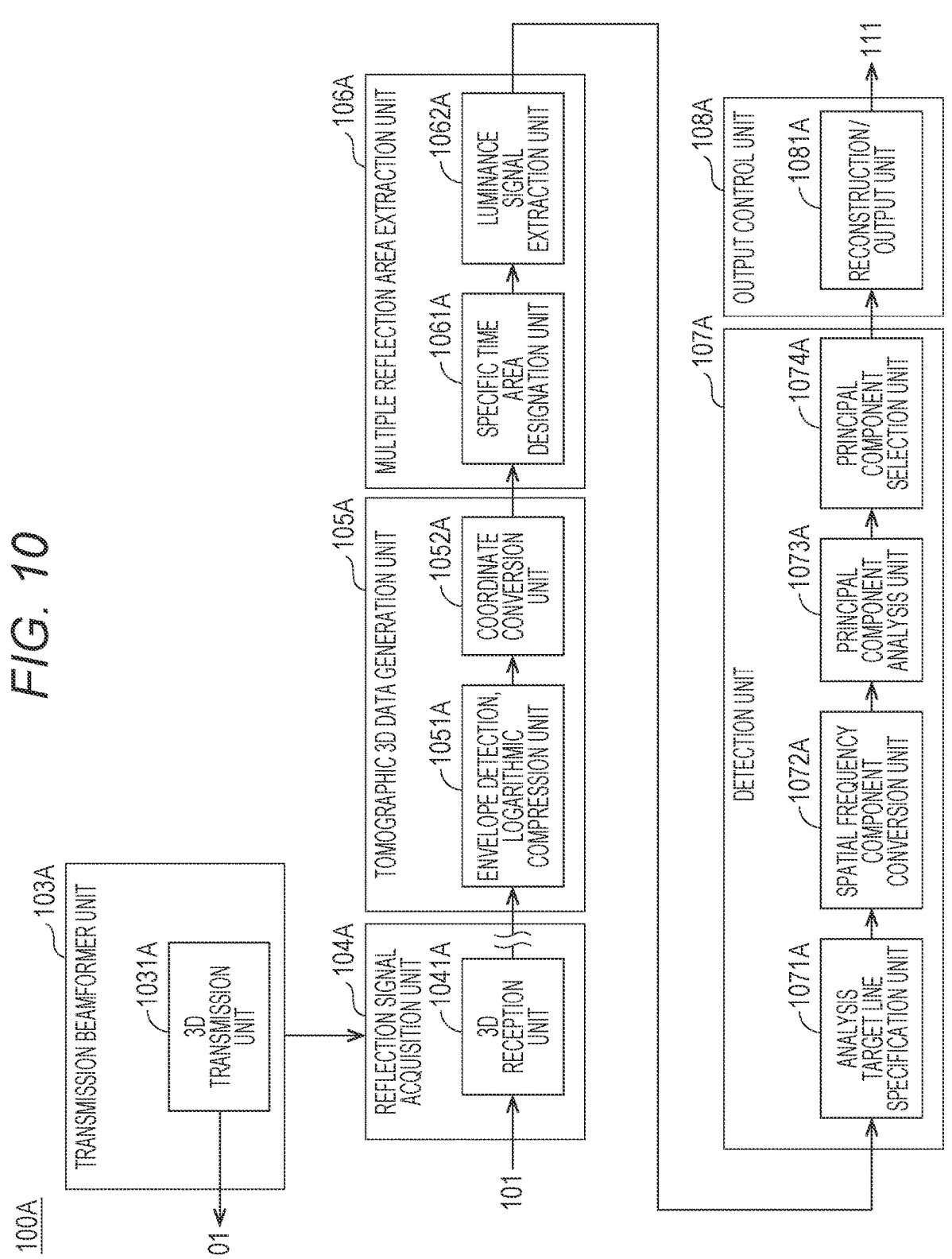
FIG. 10 is a functional block diagram illustrating configurations of a transmission beamformer unit 103A, a reflection signal acquisition unit 104A, the tomographic data generation unit 105, the multiple reflection area extraction unit 106, the detection unit 107, and the output control unit 108 in an ultrasonic scanning device 100A according to a second embodiment.

FIG. 10 is a functional block diagram illustrating a configuration of each unit in the ultrasonic scanning device 100A.

(Transmission Beamformer Unit 103A, Reflection Signal Acquisition Unit 104A)

The transmission beamformer unit 103A and the reflection signal acquisition unit 104A include a 3D transmission unit 1031A and a 3D reception unit 1041A in place of the transmission unit 1031 and the reception unit 1041 in the scanning device 100, respectively. The transmission beamformer unit 103A and the reflection signal acquisition unit 104A repeatedly transmit and receive an ultrasonic wave for one frame while gradually moving the transmission vibrator Tx in the array direction for each transmission event to generate an acoustic line signal. The transmission beamformer unit 103A and the reflection signal acquisition unit 104A repeat transmission and reception for one frame while gradually moving the scanning plane in transmission and reception for one frame perpendicular to the arrangement direction of the vibrators 101a to generate acoustic line signals for a plurality of frames necessary for generation of three-dimensional tomographic data. The gradual movement of the scanning surface may be performed by an operator of gradually moving the probe 101 perpendicular to the arrangement direction of the vibrators 101a, or may be performed by electronic scanning using a 2D probe in which vibrators are arranged in a matrix.

(Tomographic Data Generation Unit 105A)

The tomographic data generation unit 105A acquires acoustic line signals for a plurality of frames, performs conversion to a luminance value by the envelope detection, logarithmic compression unit 1051A, and coordinate conversion to an orthogonal coordinate system by the coordinate conversion unit 1052A for each frame, generates tomographic data for one frame, repeats this processing for a plurality of frames, generates three-dimensional tomographic data, and outputs the three-dimensional tomographic data to the multiple reflection area extraction unit 106A.

(Multiple Reflection Area Extraction Unit 106A)

The multiple reflection area extraction unit 106A includes a specific time area designation unit 1061A and a luminance signal extraction unit 1062A.

The specific time area designation unit 1061A extracts the multiple reflection area, which corresponds to the depth range deeper than the depth at which the real image of the inspection object can be detected in the acquired three-dimensional 3D tomographic data and in which the multiple reflection signal can be mainly detected, as the data area that can be the analysis target from the 3D tomographic data. Similarly to the configuration according to the first embodiment, the specification of the depth range is performed by designating, as the specific time area, a time area that is equal to or longer than the time in which the reflection wave from the inspection target range of the inspection object arrives and has a predetermined length. The second embodiment is different from the configuration according to the first embodiment in that the multiple reflection area to be extracted is three-dimensional voxel data in the X-Y-Z direction.

The luminance signal extraction unit 1062A extracts the luminance signal of the multiple reflection area MRA from the 3D tomographic data and outputs the luminance signal to the detection unit 107A.

(Detection Unit 107A)

The detection unit 107 selects the analysis target image data OL from the 3D tomographic data of the multiple reflection area MRA, analyzes the extracted spatial frequency by principal component analysis, and selects one or more principal components including a principal component that reacts to the spatial frequency component of the multiple reflection image MRI corresponding to the defect DL of the inspection object 300. The detection unit 107A includes an analysis target line specification unit 1071A, a spatial frequency component conversion unit 1072A, a principal component analysis unit 1073A, and a principal component selection unit 1074A.

Figures 11A, 11B:
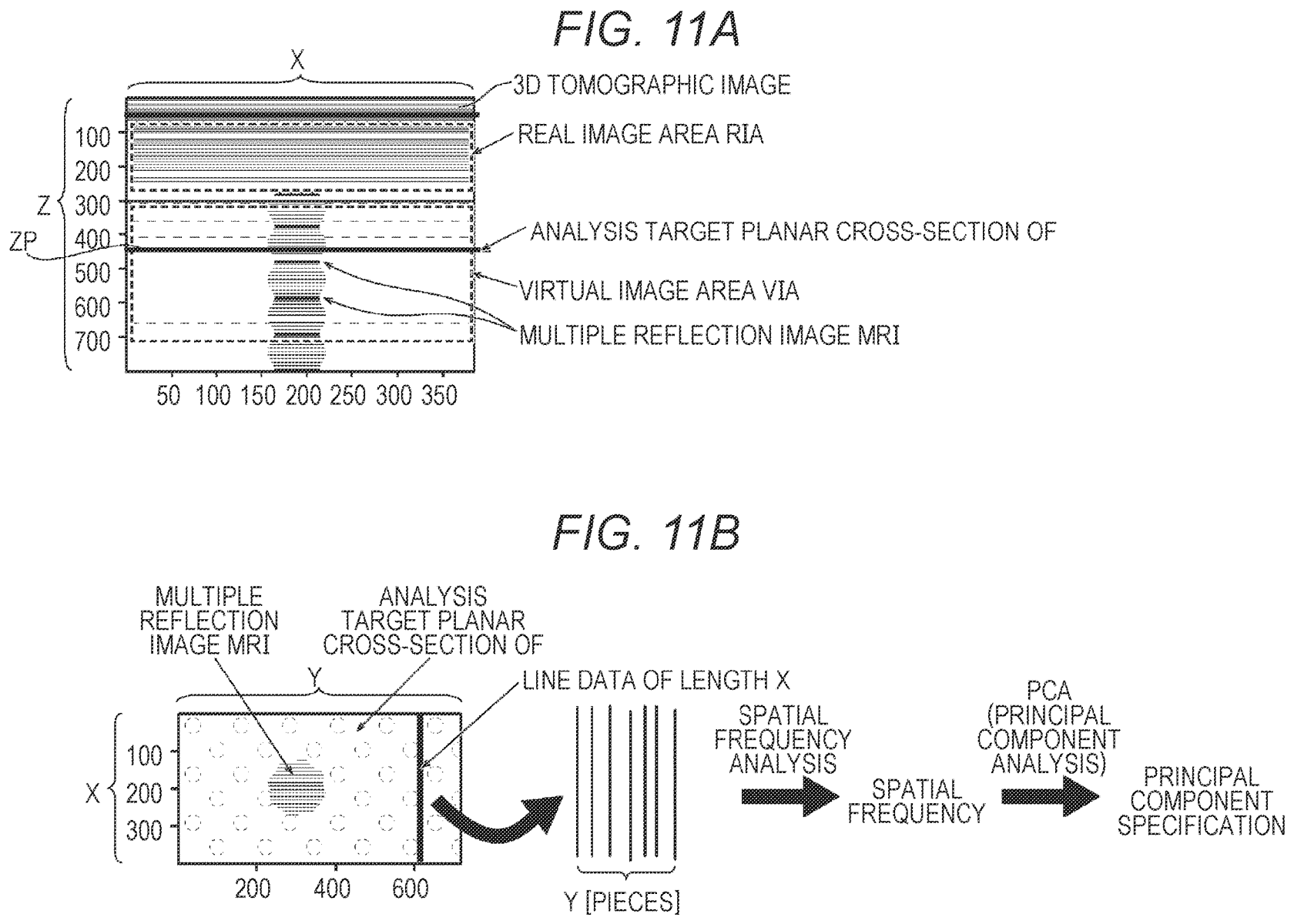

FIGS. 11A and 11B are views schematically illustrating an example of a display image drawn on the display unit 111 in the embodiment of the ultrasonic scanning device 100A. The operation of the detection unit 107A will be described using this display image. In FIGS. 11A and 11B, an X direction represents an arrangement direction of the vibrators 101a, a Y direction represents a direction perpendicular to the arrangement direction of the vibrators 101a, and a Z direction represents a depth direction.

In the present embodiment, the analysis target image data OL is planar cross-sectional image data in a planar direction of the inspection object corresponding to the specific depth ZP. As illustrated in FIG. 11A, the analysis target line specification unit 1071A selects cross-sectional image data in the planar direction of the inspection object located at the predetermined depth ZP as the analysis target planar cross-section OF from the 3D tomographic data of the multiple reflection area MRA. A plurality of the analysis target planar cross-sections OF may be selected by varying the depth ZP.

As illustrated in FIG. 11B, the spatial frequency component conversion unit 1072A converts the data of the analysis target planar cross-section OF into a set of a plurality of line data (in the embodiment, Y pieces of line data in the X direction are used) in the X or Y direction, and extracts a spatial frequency component for the set of line data.

The principal component analysis unit 1073A calculates a first principal component to an M-th principal component with M as a natural number for the spatial frequency component.

Here, the principal component analysis can be performed using a known calculation method (for example, Manabu Kano, "Principal Component Analysis", Kyoto University, January 1997, etc.). Specifically, assuming that P is the number of spatial frequency components and N is the number of samples on the line data, a data sample $\{x_{mp}\}$ (n=1, 2, . . . N, p=1, 2, . . . P) represented by a deviation from the average value is, using a matrix X, defined as follows.

[Mathematical Formula 1]

$$X = \begin{pmatrix} x_{11} & x_{12} & \cdots & x_{1P} \\ x_{21} & x_{22} & \cdots & x_{2P} \\ \vdots & \vdots & \ddots & \vdots \\ x_{N1} & x_{N2} & \cdots & x_{NP} \end{pmatrix} \qquad \text{(Formula 1)}$$

The coupling coefficient w1 is assumed as follows.

[Mathematical Formula 2]

$$w_1 = \begin{pmatrix} w_{11} \\ w_{21} \\ \vdots \\ w_{P1} \end{pmatrix} \qquad \text{(Formula 2)}$$

Given that, the first principal component z1 is defined as follows.

[Mathematical Formula 3]

$$Z_1 = \sum_{p=1}^{P} w_{p1} x_p \qquad \text{(Formula 3)}$$

The covariance matrix V is given by the following formula.

[Mathematical Formula 4]

$$V = \frac{1}{N-1} X^T X \qquad \text{(Formula 4)}$$

The coupling coefficient w1 of the first principal component z1 satisfies the following relation.

[Mathematical Formula 5]

$$(V - \lambda I) w_1 = 0 \qquad \text{(Formula 5)}$$

The Lagrange multiplier $\lambda$ is as follows.

[Mathematical Formula 6]

$$\det|V - \lambda I| = 0 \qquad \text{(Formula 6)}$$

Therefore, $\lambda$ is calculated as the eigenvalue of the covariance matrix V, and the coupling coefficient w1 of the first principal component z1 is calculated as the eigenvector corresponding to the maximum eigenvalue of the covariance matrix V. In addition, the coupling coefficient $w_M$ of the M-th principal component $z_M$ is calculated as an eigenvector corresponding to the M-th largest eigenvalue of the covariance matrix V.

In the M-th principal component selection unit 1074A, in the principal component analysis 1073A, a principal component (hereinafter, it may be referred to as a "multiple reflection image corresponding principal component") that reacts to the multiple reflection image MRI corresponding to the defect DL appears, for example, in the first principal component, and a principal component (hereinafter, it may be referred to as a "multiple reflection image non-corresponding principal component") that does not react to the multiple reflection image MRI corresponding to the defect DL appears, for example, in the second principal component in some cases, but the present invention is not limited thereto, and the principal component may appear in principal components other than the first and second principal components.

Therefore, the principal component selection unit 1074A selects one principal component (multiple reflection image corresponding principal component) including the multiple reflection image corresponding principal component reactive to the spatial frequency component of the multiple reflection image MRI corresponding to the defect DL of the inspection object from the calculated first principal component to the M-th principal component, and outputs the selected principal component to the output control unit 108A. Alternatively, a plurality of principal components including at least one multiple reflection image corresponding principal component may be selected as the selected principal component. Alternatively, all the principal components from the first principal component to the M-th principal component may be selected. The principal component to be selected may be set in advance according to the inspection target, or may be arbitrarily set.

(Output Control Unit 108A)

The output control unit 108A includes a reconstruction/output unit 1081A. The reconstruction/output unit 1081A reconstructs the analysis target image data OL for the selected principal component. Specifically, by using the principal component score and the coupling coefficient (eigenvector) obtained by the principal component analysis unit 1073A, the analysis target image data OL (in the embodiment, the analysis target planar cross-section OF) is reconstructed in the principal component direction selected by the principal component selection unit 1074A, and an image is generated and output to the display unit 111.

Specifically, the M-th principal component score of the sample $\{x_{mp}\}$ of the analysis target data with P as the number of spatial frequency components and N as the number of samples on the line data is the length of a vector obtained by projecting each sample $x_n$ (n=1, 2, . . . , N) in the P-dimensional space on the $z_M$-axis representing the M-th principal component, and the prediction value $\hat{x}_n$ obtained by reconstructing each sample $x_n$ only with the M-th principal component is calculated by using the coupling coefficient $w_M$ of the M-th principal component, by the following formula.

[Mathematical Formula 7]

$$\hat{x}_n = x_n w_M w_M^T \qquad \text{(Formula 7)}$$

Figure 12A:
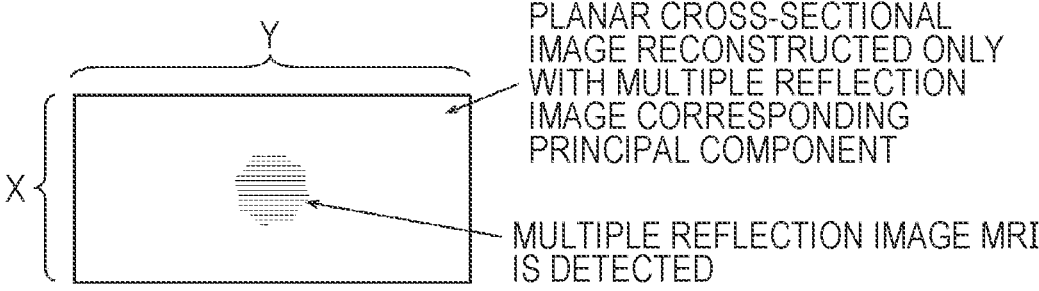
FIGS. 12A and 12B are views schematically illustrating an example of a display image drawn on the display unit 111 in the embodiment of the ultrasonic scanning device 100A.
Figure 12B:
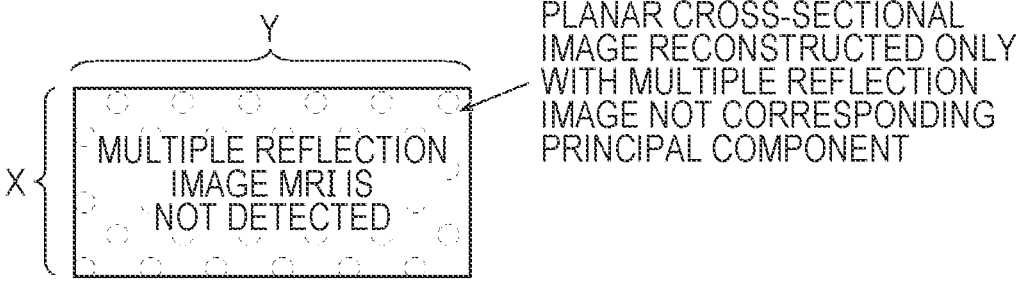

FIGS. 12A and 12B are views schematically illustrating an example of a display image drawn on the display unit 111 in the embodiment of the ultrasonic scanning device 100A. A display result by the output control unit 108A will be described using this display image. As illustrated in FIG. 12A, in the image based on the multiple reflection image corresponding principal component direction cross-sectional image data, the intensity distribution of the principal component representing the characteristic of the spatial frequency component of the multiple reflection image MRI is displayed on the analysis target planar cross-section OF, and the intensity and position of the multiple reflection image MRI are displayed as the intensity distribution of the multiple reflection image corresponding principal component. On the other hand, as illustrated in FIG. 12B, in the image based on the multi-reflection image non-corresponding principal component direction cross-sectional image data, the multiple reflection image MRI is not displayed on the analysis target planar cross-section OF.

As a result, the viewer can easily grasp the position of the defect DF of the inspection object 300 through the display image.

<Operation>

The operation of the ultrasonic scanning device 100A having the above configuration will be described.

Figure 13:
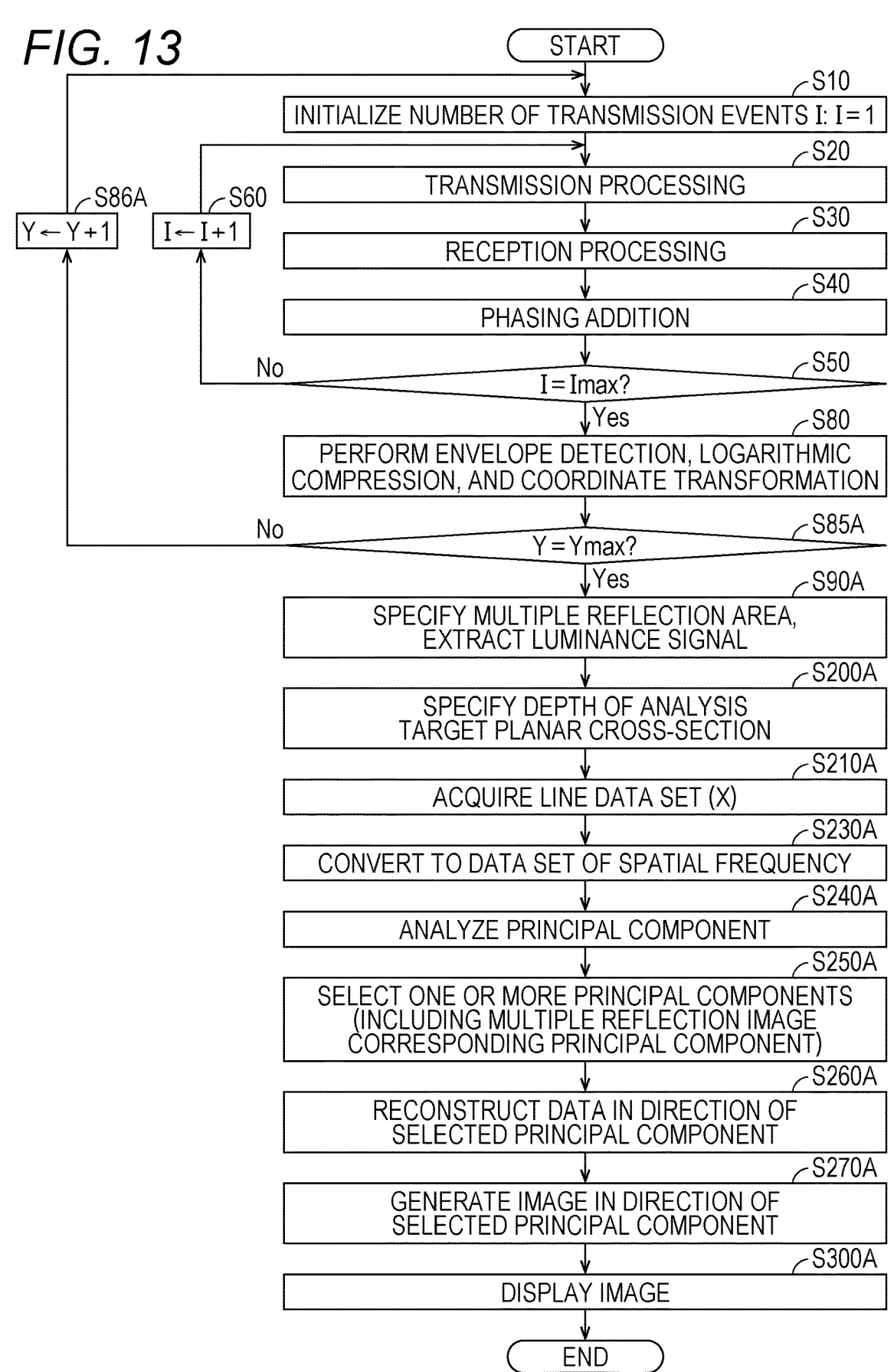
FIG. 13 is a flowchart illustrating an operation of the ultrasonic scanning device 100A.

FIG. 13 is a flowchart illustrating an operation of the ultrasonic scanning device 100A. In FIG. 13, the same processing as those in the operation of the ultrasonic scanning device 100 are denoted by the same reference signs as those in FIG. 9, and the description thereof is omitted.

In the processing of steps S10 to S90, tomographic data of one frame is generated similarly to FIG. 9.

Next, transmission and reception for one frame are repeated while the scan plane in transmission and reception for one frame is gradually moved perpendicularly to the arrangement direction of the vibrators 101a, thereby generating three-dimensional tomographic data.

Specifically, first, it is determined whether or not the position Y of the scanning plane in the direction perpendicular to the arrangement direction of the vibrators 101a in transmission and reception for one frame is the maximum value (step S85A). In a case where the position Y is not the maximum value (step S85: No), the processing returns to step S10 by incrementing Y (step S86A), and the processing of steps S10 to S90 is performed by gradually moving the scanning plane in the direction perpendicular to the arrangement direction. In a case where the position Y is the maximum value (step S85: Yes), generation of three-dimensional tomographic data is completed, and the processing proceeds to step S90A.

Next, the multiple reflection area MRA is specified from the three-dimensional tomographic data and the luminance signal is extracted (step S90A), the depth ZP of the analysis target planar cross-section OF is specified (step S200A), a set of a plurality of pieces of line data (X pieces) is acquired (step S210A), and the spatial frequency component of the set of line data is extracted and converted into the data set of the spatial frequency (step S230A).

Next, the principal component analysis is performed on the spatial frequency component (step S240A), one or more principal components including the principal component (multiple reflection image corresponding principal component) reacting with the spatial frequency component of the multiple reflection image MRI corresponding to the defect DL of the inspection object 300 are selected (step S250A), the data of the analysis target planar cross-section OF is reconstructed in the direction of the selected principal component (step S260A), the image data in the direction of the principal component is generated (step S270A), the image is displayed on the display unit 111 (step S300), and the processing is ended.

<Summary>

As described above, in the ultrasonic signal analysis device 160 included in the ultrasonic scanning device 100A according to the second embodiment, the analysis target data is the planar cross-section OF data in the plane direction of the inspection object corresponding to a specific depth, and the detection unit 107A extracts the spatial frequency of the planar cross-section OF data, selects one or more principal components including a principal component (multiple reflection image corresponding principal component) that reacts to a spatial frequency component of a multiple reflection image corresponding to a defect of the inspection object in the analysis target data by the principal component analysis, and reconstructs the planar cross-section OF data in the direction of the selected principal component to generate the principal component direction cross-sectional image data.

With this configuration, the analysis target planar cross-sectional image OF is selected from the multiple reflection area MRA located in the depth range deeper than the inspection target range of the inspection object 300, the intensity distribution in the principal component direction that reacts to the characteristic of the spatial frequency component of the multiple reflection image MRI corresponding to the defect DF of the inspection object is displayed on the analysis target planar cross-section OF, and the intensity and position of the multiple reflection image MRI are displayed as the intensity distribution of the principal component. Therefore, it is possible to accurately detect the position of the defect DF located in the shallow portion of the inspection object 300 and easily grasp the position and state of the defect DF through the display image without being affected by a strong specular reflection component such as surface reflection in the real image area RIA corresponding to the inspection target range of the shallow portion of the inspection object 300.

Third Embodiment

In the ultrasonic scanning device 100A and its ultrasonic signal analysis device 160 according to the second embodiment, data of a solid portion corresponding to a specific depth range included in the multiple reflection area MRA is selected as analysis target data, and the multiple reflection image MRI is detected using the principal component analysis for the spatial frequency. In the first and second embodiments, data converted into a luminance value after envelope detection is set as an analysis target.

In contrast, an ultrasonic scanning device 100B according to a third embodiment differs from the second embodiment in that data of a solid portion corresponding to a specific depth range ZP1 (hereinafter, the depth direction may be referred to as a Z direction) included in the multiple reflection area MRA is selected as the analysis target data, and the frequency (obtained by frequency converting a signal in the Z direction) is detected by multiple reflection image MRI using principal component analysis. The third embodiment also differs from the second embodiment in that data before envelope detection including a phase to be subjected to FFT analysis, that is, data before conversion into a luminance value is set as an analysis target. According to the method, even when there is surface reflection, it is possible to more accurately detect a defect included in the predetermined depth range ZP1 of the inspection target member.

Hereinafter, the ultrasonic scanning device 100B according to the third embodiment will be described in detail with reference to the drawings.

<Configuration>

The ultrasonic scanning device 100B according to the third embodiment is different from the ultrasonic scanning device 100A according to the second embodiment in an analysis method for detecting a multiple reflection image MRI, and the other configurations are the same as those of the ultrasonic scanning device 100A illustrated in FIG. 10. Therefore, the method of detecting multiple reflection image MRI in the ultrasonic scanning device 100A will be outlined below, and description of other configurations will be omitted.

Figure 14:
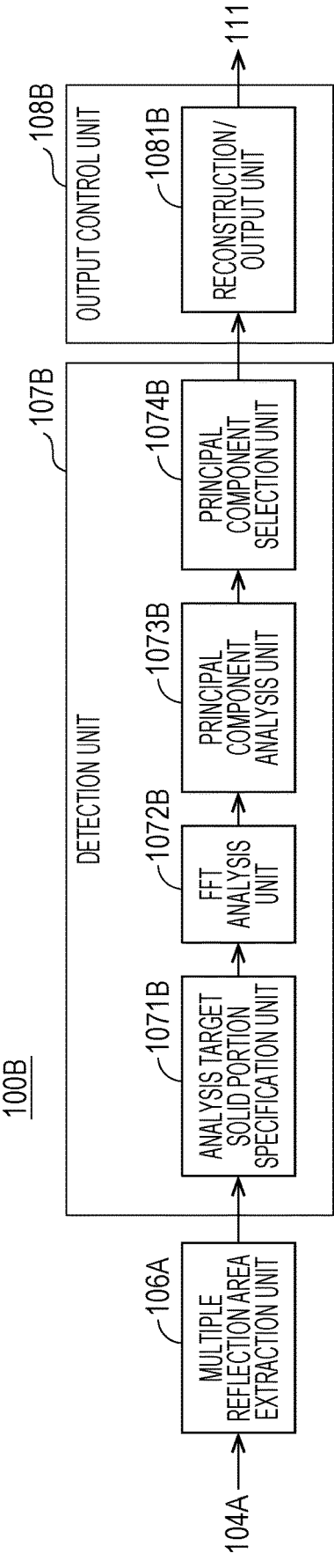
FIG. 14 is a functional block diagram illustrating configurations of a detection unit 107B and an output control unit 108B in an ultrasonic scanning device 100B according to a third embodiment.

FIG. 14 is a functional block diagram illustrating a configuration of each unit in the ultrasonic scanning device 100B.

(Detection Unit 107B)

The multiple reflection area extraction unit 106A extracts the signal of the multiple reflection area MRA from the 3D tomographic data on the basis of the acoustic line signals for a plurality of frames necessary for generating the three-dimensional tomographic data supplied from the reflection signal acquisition unit 104A, and outputs the signal to the detection unit 107B. In the present embodiment, FFT analysis is performed on the acoustic line signal before envelope detection as an analysis target.

The detection unit 107B selects the analysis target solid portion OS from the 3D tomographic data of the multiple reflection area MRA, converts a signal extracted from the data of the solid portion OS into a frequency by FFT, and performs principal component analysis, thereby selecting one or more principal components including a principal component reacting with a frequency component of the multiple reflection image MRI corresponding to the defect DL of the inspection object 300. The detection unit 107B includes an analysis target solid portion specification unit 1071B, an FFT analysis unit 1072B, a principal component analysis unit 1073B, and a principal component selection unit 1074B.

Figure 15:
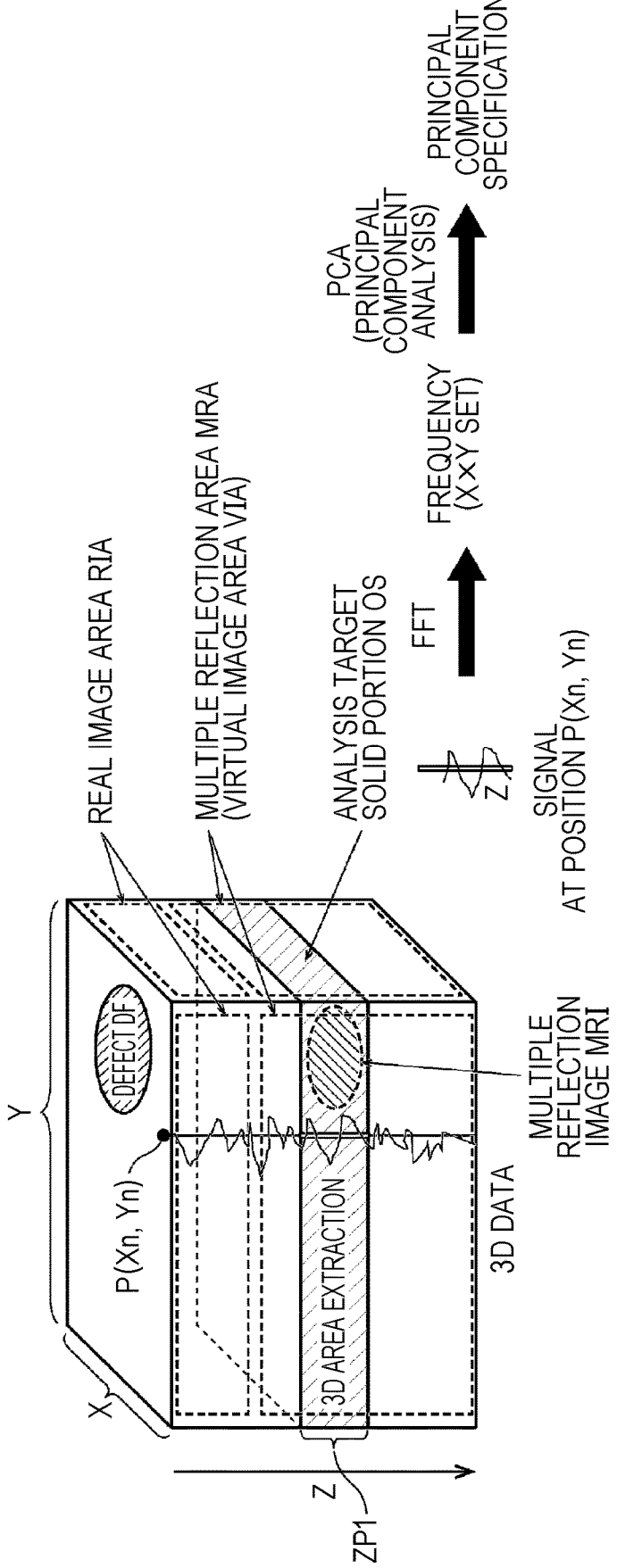
FIG. 15 is a schematic diagram for explaining the operation of the ultrasonic scanning device 100B.

FIG. 15 is a schematic diagram for explaining the operation of the ultrasonic scanning device 100B. In FIG. 15, an X direction represents an arrangement direction of the vibrators 101a, a Y direction represents a direction perpendicular to the arrangement direction of the vibrators 101a, and a Z direction represents a depth direction.

In the present embodiment, the analysis target data is data of the solid portion OS corresponding to the specific depth range ZP1. As illustrated in FIG. 15, the analysis target solid portion specification unit 1071B selects a solid portion located in the predetermined depth range ZP1 as the analysis target solid portion OS from the data of the multiple reflection area MRA.

The FFT analysis unit 1072B performs FFT analysis (Fast Fourier Transform: FFT) on the data of the analysis target solid portion OS for the data on the line data in the Z direction passing through the position P (Xn, Yn), extracts a frequency component for the line data, repeats the FFT analysis while making the position P (Xn, Yn) different, and extracts a frequency component for all the data in the analysis target solid portion OS.

The principal component analysis unit 1073B performs principal component analysis on the obtained frequency component, and calculates a first principal component to an M-th principal component (M is a natural number).

The principal component selection unit 1074B selects one principal component (multiple reflection image corresponding principal component) including the multiple reflection image corresponding principal component reactive to the spatial frequency component of the multiple reflection image MRI corresponding to the defect DL of the inspection object from the calculated first principal component to the M-th principal component, and outputs the selected principal component to the output control unit 108A. Again, a plurality of principal components including at least one multiple reflection image corresponding principal component may be selected as the selected principal component. Alternatively, all the principal components from the first principal component to the M-th principal component may be selected. The principal component to be selected may be set in advance according to the inspection target, or may be arbitrarily set.

(Output Control Unit 108)

The output control unit 108 includes a reconstruction/output unit 1081B. The reconstruction/output unit 1081B reconstructs the analysis target image data OL for the selected principal component. Specifically, by using the principal component score and the coupling coefficient (eigenvector) obtained by the principal component analysis unit 1073B, the analysis target image data OL (in the embodiment, the analysis target solid portion OS) is reconstructed in the principal component direction selected by the principal component selection unit 1074B, and an image is generated and output to the display unit 111.

Accordingly, even when there is surface reflection, it is possible to more accurately detect the defect included in the predetermined depth range ZP1 of the inspection target member, and the viewer can easily grasp the state of the defect DF included in the predetermined depth range ZP1 of the inspection object 300 through the display image.

<Operation>

The operation of the ultrasonic scanning device 100B having the above configuration will be described.

Figure 16:
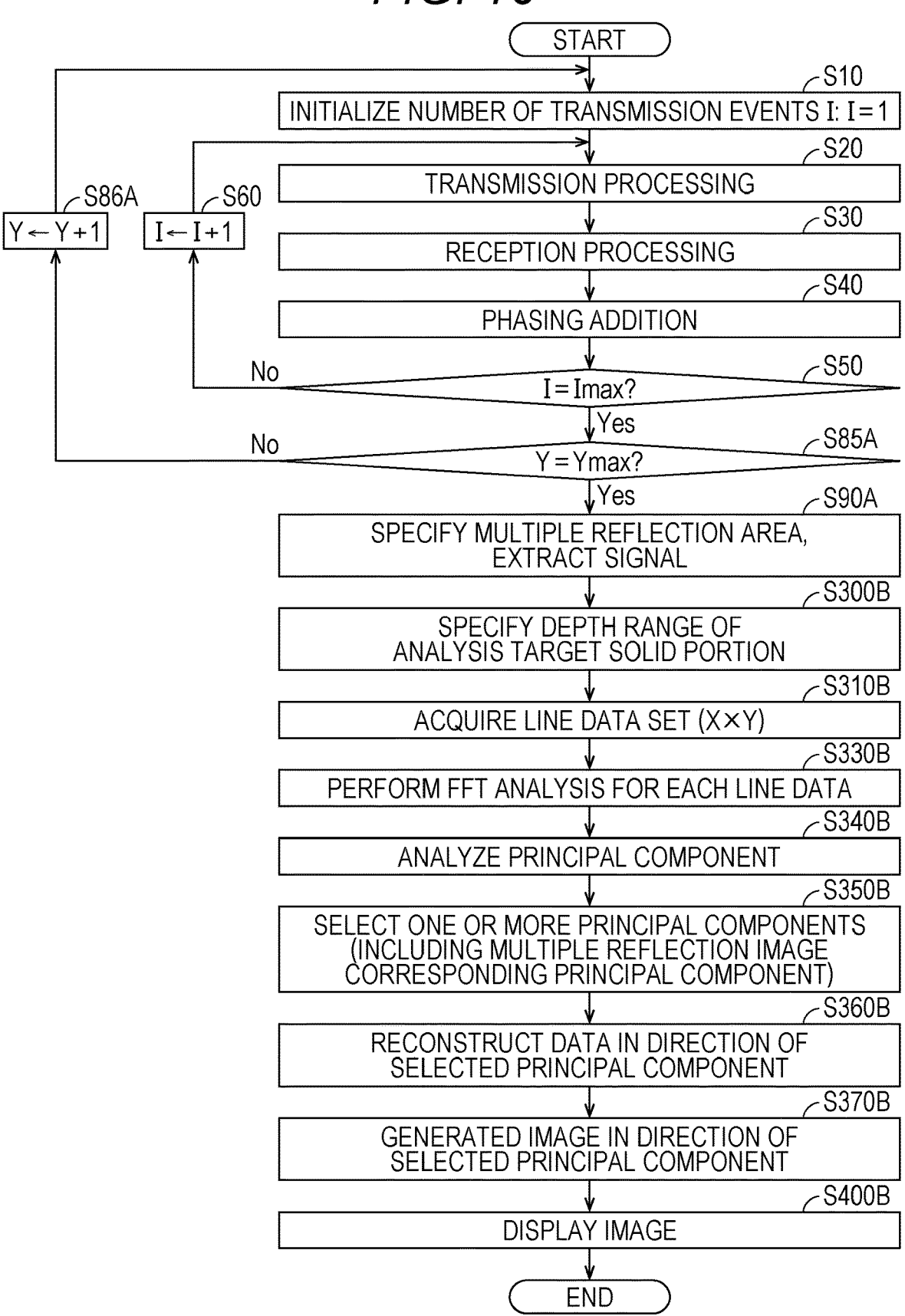
FIG. 16 is a flowchart illustrating an operation of the ultrasonic scanning device 100B.

FIG. 16 is a flowchart illustrating an operation of the ultrasonic scanning device 100B. In FIG. 16, the same processing as those in the operation of the ultrasonic scanning device 100A are denoted by the same reference signs as those in FIG. 13, and the description thereof is omitted.

In the processing of steps S10 to 60, S85A, and 86A, acoustic line signals for a plurality of frames necessary for generating three-dimensional tomographic data are generated, and in step S90A, the multiple reflection area MRA is specified from the generated three-dimensional tomographic data and a signal is extracted.

Next, the depth range ZP1 of the analysis target solid portion OS is specified (step S300B), a set of a plurality of pieces of line data (X×Y pieces) is acquired (step S310B), the set of line data is subjected to FFT analysis to extract a frequency component, and the frequency component is converted into a data set of frequency (step S330B).

Next, the principal component analysis is performed on the frequency component (step S340B), one or more principal components including the principal component (multiple reflection image corresponding principal component) reacting with the frequency component of the multiple reflection image MRI corresponding to the defect DL of the inspection object 300 are selected (step S350B), the data of the analysis target solid portion OS is reconstructed in the direction of the selected principal component (step S360B), the principal component direction image data is generated (step S370B), the image is displayed on the display unit 111 (step S400B), and the processing is ended.

<Summary>

As described above, the ultrasonic signal analysis device 160 included in the ultrasonic scanning device 100B according to the third embodiment adopts a configuration in which the analysis target data is data of a solid portion corresponding to a specific depth range ZP1, the detection unit 107B performs fast Fourier transform and frequency transform on the analysis target data for each unit data corresponding to the spatial position P (Xn, Yn), selects one or more principal components including a principal component (multiple reflection image corresponding principal component) reactive to a frequency component of a multiple reflection image corresponding to the defect DF of the inspection object in the analysis target data by principal component analysis, and the output control unit 108B reconstructs the analysis target data in a direction of the selected principal component to generate the principal component direction image data.

With this configuration, the analysis target solid portion OS is selected from the multiple reflection area MRA located in the depth range deeper than the inspection target range of the inspection object 300, the intensity distribution in the principal component direction that reacts to the characteristic of the frequency component of the multiple reflection image MRI corresponding to the defect DF of the inspection object is displayed on the analysis target solid portion OS, and the intensity and position of the multiple reflection image MRI are displayed as the intensity distribution of the multiple reflection image corresponding principal component. Therefore, it is possible to accurately detect the position of the defect DF located in the predetermined depth range ZP1 of the inspection object 300 and easily grasp the state of the defect DF through the display image without being affected by a strong specular reflection component such as surface reflection in the real image area RIA corresponding to the inspection target range of the shallow portion of the inspection object 300.

<<Ultrasonic Signal Analysis System 1>>

The embodiments of the present disclosure are implemented as an ultrasonic signal analysis system 1 that collects and analyzes tomographic data from an ultrasonic scanning device 100 via a network. Hereinafter, an ultrasonic signal analysis system 1 according to the embodiments will be described in detail with reference to the drawings.

Figure 17:
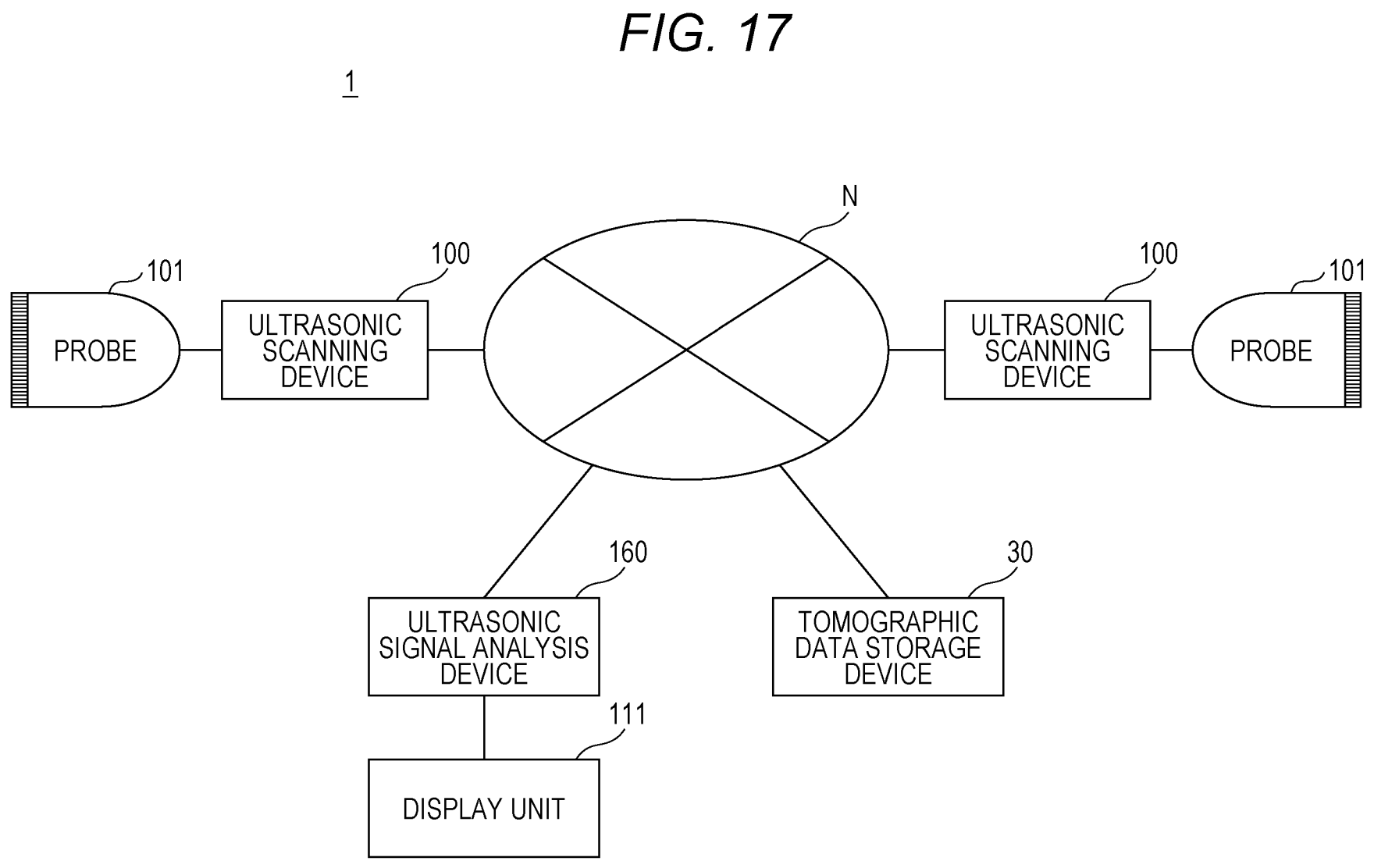

FIG. 17 is a schematic configuration diagram of an ultrasonic signal analysis system 1. As illustrated in FIG. 17, the ultrasonic signal analysis system 1 includes a plurality of ultrasonic scanning devices 100, a tomographic data storage device 30, and an ultrasonic signal analysis device 160 connected to a communication network N.

The communication network N is, for example, the Internet, and the plurality of ultrasonic scanning devices 100, the tomographic data storage device 30, and the ultrasonic signal analysis device 160 are connected so as to be able to exchange information with each other.

The ultrasonic scanning device 100 acquires tomographic data of the inspection object via the connected probe 101 and supplies the tomographic data via the communication network N. In the ultrasonic scanning system 1, the ultrasonic scanning device 100 may be configured to function as a tomographic data generation device in which only the transmission beamformer unit 103, the multiplexer 102, the reflection signal acquisition unit 104, and the tomographic data generation unit 105 are operated without using the function of the ultrasonic signal analysis device 160 among the functional blocks illustrated in FIG. 1.

The tomographic data storage device 30 is, for example, a computer-readable recording medium such as a hard disk, and acquires and stores tomographic data supplied from the ultrasonic scanning device 100.

As illustrated in FIG. 1, the ultrasonic signal analysis device 160 includes the multiple reflection area extraction unit 106, the detection unit 107, and the output control unit 108, reads tomographic data stored in the tomographic data storage device 30, or receives supply of tomographic data from the ultrasonic scanning device 100, detects a multiple reflection image MRI in the tomographic data by the analysis method according to any one of the first to third embodiments, thereby detecting a defect DF in an inspection target member, and outputs a detection result to the display unit 111 to display the detection result. Furthermore, the ultrasonic signal analysis device 160 outputs the detection result to the ultrasonic signal analysis device 160 via the communication network N and stores the detection result.

With such a configuration, in the ultrasonic scanning system 1, the tomographic data acquired by the plurality of ultrasonic scanning devices 100 can be supplied to the ultrasonic signal analysis device 160 via the communication network N to detect the defect located in the shallow portion of the inspection target member.

<<Modifications>>

Although the configuration according to the embodiment has been described, the present disclosure is not limited to the above embodiments at all except for essential characteristic components thereof. For example, modes obtained by making various modifications to the embodiments and modes realized by arbitrarily combining components and functions in the embodiments without departing from the gist of the present invention are also included in the present disclosure. Hereinafter, a modification will be described as an example of such a mode.

(1) In the above embodiments, the aspect of the ultrasonic measurement in which the defect portion DL is detected by irradiating the inspection object with the 300 ultrasonic beam and detecting the multiple reflection image MRI based on the reflection wave has been described. However, application of the wave motion analysis of the present invention is not limited to ultrasonic measurement, and can be widely applied to wave motion analysis using radio waves, light waves, and electromagnetic waves.

(2) In the ultrasonic scanning devices 100A and B according to the second and third embodiments, the detection unit 107 is configured to analyze the analysis target data by the principal component analysis to detect the multiple reflection image MRI corresponding to the defect DL of the inspection object 300, but may be configured to detect the multiple reflection image MRI from the analysis target data using another multivariate analysis method.

(3) In the ultrasonic scanning device 100 according to the embodiments, the configurations of the transmission beamformer unit 103 and the reflection signal acquisition unit 104 can be appropriately changed from the configurations described in the first embodiment. For example, in the first embodiment, the transmission unit 1031 sets the transmission aperture Tx including an array of transmission vibrators corresponding to a part of the plurality of vibrators 101a existing in the probe 101, repeats ultrasonic wave transmission while gradually moving the transmission aperture Tx in the array direction for each ultrasonic wave transmission, and performs ultrasonic wave transmission from all the vibrators 101a existing in the probe 101.

However, ultrasonic transmission may be performed from all the vibrators 101a existing in the probe 101. Reflected ultrasonic waves can be received from the entire ultrasonic irradiation area Ax by one ultrasonic wave transmission without repeating the ultrasonic wave transmission.

(4) In the embodiments, the calculation target area Bx is a linear area that passes through the array center of the reception aperture Rx, is perpendicular to the vibrator array, and has a single vibrator width.

However, the calculation target area Bx is not limited thereto, and may be set to an arbitrary area included in the ultrasonic irradiation area Ax. For example, a band-shaped rectangular area having a plurality of vibrator widths with a center line being a straight line passing through the array center of the reception vibrator and perpendicular to the vibrator array may be used. In addition, a hourglass-shaped area may be used. In addition, the calculation target area Bx set for each transmission event may be set to overlap in the vibrator array direction. The S/N ratio of the ultrasound image generated by synthesizing the acoustic line signals of the overlapping areas by the synthetic aperture method can be improved.

(5) In the first embodiment, the probe has a probe configuration in which a plurality of piezoelectric elements is arranged in a one-dimensional direction. However, the configuration of the probe is not limited to this, and for example, a two-dimensional array vibrator in which a plurality of piezoelectric conversion elements is arranged in a two-dimensional direction or a swing type probe in which a plurality of vibrators arranged in a one-dimensional direction is mechanically swung to acquire three-dimensional tomographic data may be used, and the probe can be appropriately used according to the measurement. For example, when two-dimensionally arranged probes are used, the irradiation position and direction of the ultrasonic beam to be transmitted can be controlled by individually changing the timing of applying a voltage to the piezoelectric conversion element and the value of the voltage.

In the ultrasonic scanning device, the probe and the display unit are connected from the outside. Alternatively, the probe and the display unit may be integrally provided in the ultrasonic scanning device.

(6) In the embodiments, the reception beamforming processing is performed in synchronization with the transmission of the ultrasonic wave, but the present invention is not limited to this case. For example, the aspect of the present disclosure may be applied in the synthetic aperture method, and phasing addition may be performed after a plurality of times of ultrasonic wave transmission/reception for one frame is completed. Furthermore, each operation other than the calculation of the reception time is not limited to the above case, and arbitrary control may be performed. (7) Although one aspect of the present disclosure has been described on the basis of the above-described embodiments, one aspect of the present disclosure is not limited to the above-described first embodiment, and the following case is also included in one aspect of the present disclosure.

For example, one aspect of the present disclosure may be a computer system including a microprocessor and a memory, in which the memory stores the computer program, and the microprocessor operates according to the computer program. For example, it may be a computer system that has a computer program of the ultrasonic signal processing method of the present invention and operates according to this program (or instructs each connected part to operate).

Further, the present invention also includes a case where all or a part of the ultrasonic scanning device and all or a part of the ultrasonic signal processing device are configured by a computer system including a microprocessor, a recording medium such as a ROM and a RAM, a hard disk unit, and the like. The RAM or the hard disk unit stores a computer program for achieving the same operation as each of the above devices. The microprocessor operates in accordance with the computer program, whereby each device achieves its function.

In addition, some or all of the components constituting each of the above-described devices may be constituted by one system large scale integration (LSI). The system LSI is a super multifunctional LSI manufactured by integrating a plurality of components on one chip, and is specifically a computer system including a microprocessor, a ROM, a RAM, and the like. These may be individually integrated into one chip, or may be integrated into one chip so as to include a part or all of them. Note that the LSI may be referred to as an IC, a system LSI, a super LSI, or an ultra LSI depending on the degree of integration. The RAM stores a computer program for achieving the same operation as each of the above devices. The microprocessor operates in accordance with the computer program, whereby the system LSI achieves its function. For example, a case where the beamforming method of the present invention is stored as an LSI program, the LSI is inserted into a computer, and a predetermined program (beamforming method) is executed is also included in the present invention.

The circuit integration method is not limited to LSI, and may be realized by a dedicated circuit or a general-purpose processor. An FPGA (Field Programmable Gate Array) that can be programmed after manufacturing of the LSI or a reconfigurable processor (Reconfigurable Processor) in which connections and settings of circuit cells inside the LSI can be reconfigured may be used.

Further, when a circuit integration technology replacing the LSI appears due to the progress of the semiconductor technology or another derived technology, the functional blocks may be integrated using the technology.

In addition, some or all of the functions of the ultrasonic scanning device according to each first embodiment may be realized by a processor such as a CPU executing a program. A non-transitory computer-readable recording medium in which a program for performing a scanning method of the ultrasonic scanning device or a beamforming method is recorded may be used. The program or signal may be recorded on a recording medium and transferred, so that the program may be implemented by another independent computer system. Furthermore, it goes without saying that the program can be distributed via a transmission medium such as the Internet.

In the ultrasonic scanning device according to the above embodiments, the data storage unit which is a storage device is included in the ultrasonic scanning device, but the storage device is not limited thereto, and a semiconductor memory, a hard disk drive, an optical disk drive, a magnetic storage device, or the like may be connected to the ultrasonic scanning device from the outside.

Furthermore, the division of the functional blocks in the block diagram is an example, and a plurality of functional blocks may be realized as one functional block, one functional block may be divided into a plurality of functional blocks, or some functions may be transferred to another functional block. In addition, functions of a plurality of functional blocks having similar functions may be processed in parallel or in a time division manner by single hardware or software.

In addition, the order in which the above steps are executed is for specifically describing the present invention, and may be an order other than the above order. In addition, some of the above steps may be executed simultaneously (in parallel) with other steps.

In addition, at least some of the functions of the ultrasonic scanning devices according to each of the embodiments and the modifications thereof may be combined. Furthermore, the numbers used above are all illustrated to specifically describe the present invention, and the present invention is not limited to the illustrated numbers.

Furthermore, the present invention also includes various modifications in which changes within a range easily conceived by those skilled in the art are made to the present embodiments.

<<Summary>>

A wave motion analysis device according to an aspect of the present disclosure is a wave motion analysis device that detects a defect of an inspection object on the basis of a reflection wave obtained from the inspection object, the wave motion analysis device including: a multiple reflection area extraction unit that acquires tomographic data generated on the basis of the reflection wave and extracts a multiple reflection area from the tomographic data; and a detection unit that detects a multiple reflection image corresponding to the defect of the inspection object from the extracted multiple reflection area. Further, the multiple reflection area may correspond to a depth range deeper than a depth at which a real image of the inspection object can be detected in the tomographic data, and may be an area in which a multiple reflection signal can be mainly detected.

With such a configuration, defect detection in the real image area is avoided, and the signal from the multiple reflection area MRA in which the multiple reflection is visualized is set as an analysis target, whereby the defect located in the shallow portion of the inspection target member can be accurately detected even when the surface reflection is present.

In another aspect, in any one of the above aspects, the detection unit may be configured to select line data located at a predetermined depth from the multiple reflection area, and in a case where there is a data portion exceeding a threshold luminance in a stepwise manner over a predetermined length or more in the line data, determine the data portion as the multiple reflection image and detect the data portion.

With such a configuration, it is possible to select the analysis target line OL from the multiple reflection area MRA and detect the presence or absence of the multiple reflection image MRI indicating the defect DF of the inspection object 300 with a simple configuration.

In another aspect, in any one of the above aspects, the multiple reflection area extraction unit may be configured to extract the multiple reflection area on the basis of a preset parameter.

In another aspect, in any one of the above aspects, the multiple reflection area extraction unit may be configured to extract the multiple reflection area by determining signal attenuation or the like.

In another aspect, in any one of the above aspects, the multiple reflection area extraction unit may be configured to extract data of a time-series luminance signals in the multiple reflection area and generate a signal train to be analyzed.

In another aspect, in any one of the above aspects, the multiple reflection area extraction unit may be configured to calculate an average value of luminance signals in the multiple reflection area to generate a signal train to be analyzed.

In another aspect, in any one of the above aspects, the multiple reflection area extraction unit may be configured to calculate a maximum value of a luminance signal in the multiple reflection area to generate a signal train to be analyzed.

In another aspect, in any one of the above aspects, the detection unit selects, from the multiple reflection area, planar cross-sectional data in a planar direction of the inspection object corresponding to a specific depth, extracts a spatial frequency of the planar cross-sectional data, and selects one or more principal components including a principal component that reacts to a spatial frequency component of a multiple reflection image corresponding to a defect of the inspection object in the planar cross-sectional data by principal component analysis. Further, it may be configured to include a reconstruction/output unit, and reconstruct the planar cross-sectional data in the selected principal component direction to generate cross-sectional image data in the principal component direction.

With this configuration, it is possible to accurately detect the position of the defect DF located in the shallow portion of the inspection object 300 and easily grasp the position and state of the defect DF through the display image without being affected by a strong specular reflection component such as surface reflection of the shallow portion of the inspection object 300.

Furthermore, in another aspect, in any one of the above aspects, the detection unit selects data of a solid portion corresponding to a specific depth range from the multiple reflection area, performs fast Fourier transform on the data of the solid portion for each unit data corresponding to a spatial position to perform frequency conversion, and selects one or more principal components including a principal component that reacts to a frequency component of a multiple reflection image corresponding to a defect of the inspection object in the data of the solid portion by principal component analysis. Further, it may be configured to include a reconstruction/output unit, and reconstruct the data of the solid portion in the selected principal component direction to generate the principal component direction image data.

With this configuration, it is possible to accurately detect the position of the defect DF located in the predetermined depth range ZP1 of the inspection object 300 and easily grasp the state of the defect DF through the 3D display image without being affected by a strong specular reflection component such as surface reflection of the shallow portion of the inspection object 300.

In another aspect, in any one of the above aspects, the output control unit may be configured to generate first principal component direction 3D image data obtained by reconstructing the analysis target image data in the first principal component direction and second principal component direction 3D image data obtained by reconstructing the analysis target image data in the second principal component direction.

In addition, one aspect of the present disclosure may be a scanning device including: the wave motion analysis device according to any one of the above aspects: a reflection signal acquisition unit that acquires a reflection signal based on a reflection wave obtained from the inspection object on the basis of a wave motion from a probe; and a tomographic data generation unit that generates tomographic data on the basis of the reflection signal and supplies the tomographic data to the multiple reflection area extraction unit.

With such a configuration, it is possible to avoid defect detection in the real image area and to realize a scanning device capable of accurately detecting a defect located in a shallow portion of an inspection target member even in a case where surface reflection is present by setting a signal from a multiple reflection area where multiple reflection is visualized as an analysis target. In any one of the above aspects, the tomographic data generation unit may be a scanning device that generates the tomographic data by converting the reflection signal into luminance data.

With such a configuration, by performing the principal component analysis on the spatial frequency component of the cross-sectional data, a plurality of principal components can be specified, and the multiple reflection image corresponding area and the multiple reflection non-corresponding area can be specified from among the plurality of principal components.

In any one of the above aspects, the tomographic data generation unit may be a scanning device that logarithmically compresses the reflection signal and converts the reflection signal into the luminance data.

With such a configuration, by performing the principal component analysis after performing the logarithmic compression, the resolution in the low luminance portion can be improved, and the level of analysis accuracy can be made uniform from low luminance to high luminance.

In addition, one aspect of the present disclosure may be a wave motion analysis system including the wave motion analysis device according to any one of the above aspects and a tomographic data generation device that generates tomographic data on the basis of a reflection wave obtained from an inspection object.

With such a configuration, the tomographic data acquired by the plurality of scanning devices can be supplied to the wave motion signal analysis device via the communication network N to detect the defect located at the shallow portion of the inspection target member.

In addition, a wave motion analysis system according to an aspect of the present disclosure may be a wave motion analysis system including the wave motion analysis device according to any one of the above aspects and a tomographic data generation device that generates a wave motion using a probe, acquires a reflection signal based on a reflection wave obtained from an inspection object, and generates tomographic data on the basis of the reflection signal.

With such a configuration, the tomographic data acquired by the plurality of scanning devices can be supplied to the wave motion signal analysis device via the communication network N to detect the defect located at the shallow portion of the inspection target member.

Further, one aspect of the present disclosure may be a wave motion analysis method for detecting a defect of an inspection object on the basis of a reflection wave obtained from the inspection object, the method including: acquiring tomographic data generated on the basis of the reflection wave: extracting, from the tomographic data, a multiple reflection area that corresponds to a depth range deeper than a depth at which a real image of the inspection object can be detected in the tomographic data and in which multiple reflection signals can be mainly detected; and detecting a multiple reflection image corresponding to the defect of the inspection object from the extracted multiple reflection area.

With such a configuration, it is possible to realize the wave motion signal analysis method capable of acquiring the tomographic data acquired by the scanning device and detecting the defect located in the shallow portion of the inspection target member.

Further, one aspect of the present disclosure may be a program that causes a computer to perform a wave motion analysis processing of detecting a defect of an inspection object on the basis of a reflection wave obtained from the inspection object, the wave motion analysis processing including: acquiring tomographic data generated on the basis of the reflection wave: extracting, from the tomographic data, a multiple reflection area that corresponds to a depth range deeper than a depth at which a real image of the inspection object can be detected in the tomographic data and in which multiple reflection signals can be mainly detected; and detecting a multiple reflection image corresponding to the defect of the inspection object from the extracted multiple reflection area.

With such a configuration, it is possible to realize the wave motion signal analysis processing program capable of acquiring the tomographic data acquired by the scanning device and detecting the defect located in the shallow portion of the inspection target member.

<<Supplementary Note>>

Each of the embodiments described above shows a preferred specific example of the present invention. Numerical values, shapes, materials, constitutional elements, arrangement positions and connection forms of the constitutional elements, steps, order of the steps, and the like shown in the first embodiment are merely examples, and are not intended to limit the present invention. Further, among the constituent elements in the first embodiment, a step not described in an independent claim indicating the most generic concept of the present invention is described as an arbitrary constituent element constituting a more preferable mode.

In addition, in order to facilitate understanding of the invention, scales of components in the drawings described in the first embodiment may be different from actual scales. In addition, the present invention is not limited by the description of each embodiment described above, and can be appropriately changed without departing from the gist of the present invention.

Furthermore, in the ultrasonic scanning device, members such as a circuit component and a lead wire are also present on a substrate, but various aspects can be implemented on the basis of general knowledge in the art regarding electrical wiring and an electrical circuit, and the description is omitted because it is not directly relevant to the description of the present invention. Each of the drawings described above is a schematic diagram, and is not necessarily strictly illustrated.

INDUSTRIAL APPLICABILITY

The wave motion analysis device, the wave motion analysis system, the scanning device, the wave motion analysis method, and the program according to the present disclosure can be widely utilized for non-destructive inspection for defect detection using a probe including a vibrator array.

| Reference Signs List | |
|---|---|
| 1000 | Ultrasonic scanning device set (scanning device set) |
| 100, 100A, 100B | Ultrasonic scanning device (scanning device) |
| 150 | Ultrasonic signal processing device |
| 160 | Ultrasonic signal analysis device (wave motion analysis device) |
| 101 | Probe (ultrasonic probe) |
| 101a | Vibrator |
| 102 | Multiplexer unit |
| 103, 103A | Transmission beamformer unit |
| 1031, 1031A | Transmission unit |
| 104, 104A | Reflection signal acquisition unit |
| 105, 105A | Tomographic data generation unit |
| 106, 106A | Multiple reflection area extraction unit |
| 107, 107A, 107B | Detection unit |
| 108, 108A, 108B | Output control unit |
| 109 | Control unit |
| 110 | Data storage unit |
| 111 | Display unit |
| 200 | Housing |
| 211 | Holding member |
| 300 | Inspection object |
| 1 | Ultrasonic signal analysis system (wave motion analysis system) |

The invention claimed is:

1. A wave motion analysis device that detects a defect of an inspection object on a basis of a reflection wave obtained from the inspection object, the wave motion analysis device comprising:

a multiple reflection area extractor that acquires tomographic data generated on a basis of the reflection wave and extracts a multiple reflection area from the tomographic data; and a detector that detects a multiple reflection image corresponding to the defect of the inspection object from the extracted multiple reflection area, wherein the multiple reflection area extractor designates, as a specific time area, a time area that is equal to or longer than a time in which the reflection wave from an inspection target range of the inspection object reaches and has a predetermined length, and specifies, as the multiple reflection area, an area where image data based on a reflection signal obtained in the specific time area exists in the tomographic data.

2. The wave motion analysis device according to claim 1, wherein the multiple reflection area corresponds to a depth range deeper than a depth at which a real image of the inspection object is able to be detected in the tomographic data, and is an area in which a multiple reflection signal is able to be detected.

3. The wave motion analysis device according to claim 1, wherein the detector selects line data located at a predetermined depth from the multiple reflection area, and in a case where there is a data portion exceeding a threshold luminance in a stepwise manner over a predetermined length or more in the line data, the detector determines the data portion as the multiple reflection image and detects the data portion.

4. The wave motion analysis device according to claim 1, wherein the multiple reflection area extractor extracts the multiple reflection area on a basis of a preset parameter.

5. The wave motion analysis device according to claim 1, wherein the multiple reflection area extractor extracts the multiple reflection area by determining signal attenuation.

6. The wave motion analysis device according to claim 1, wherein the multiple reflection area extractor extracts data of a time-series luminance signal in the multiple reflection area and generates a signal train to be analyzed.

7. The wave motion analysis device according to claim 1, wherein the multiple reflection area extractor calculates an average value of luminance signals in the multiple reflection area to generate a signal train to be analyzed.

8. The wave motion analysis device according to claim 1, wherein the multiple reflection area extractor calculates a maximum value of luminance signals in the multiple reflection area to generate a signal train to be analyzed.

9. The wave motion analysis device according to claim 1, wherein the detector selects, from the multiple reflection area, planar cross-sectional data in a planar direction of the inspection object corresponding to a specific depth, extracts a spatial frequency of the planar cross-sectional data, and selects one or more principal components including a principal component that reacts to a spatial frequency component of a multiple reflection image corresponding to a defect of the inspection object in the planar cross-sectional data by principal component analysis.

10. The wave motion analysis device according to claim 1, wherein the detector selects data of a solid portion corresponding to a specific depth range from the multiple reflection area, performs fast Fourier transform on the data of the solid portion for each unit data corresponding to a spatial position to perform frequency conversion, and selects one or more principal components including a principal component that reacts to a frequency component of a multiple reflection image corresponding to a defect of the inspection object in the data of the solid portion by principal component analysis.

11. A scanning device comprising:

the wave motion analysis device according to claim 1;

a reflection signal acquisitor that acquires a reflection signal based on a reflection wave obtained from the inspection object on a basis of a wave motion from a probe; and a tomographic data generator that generates tomographic data on a basis of the reflection signal and supplies the tomographic data to the multiple reflection area extractor.

12. A wave motion analysis system comprising:

the wave motion analysis device according to claim 1; and a tomographic data generation device that generates tomographic data on a basis of a reflection wave obtained from an inspection object.

13. A wave motion analysis system comprising:

the wave motion analysis device according to claim 1; and a tomographic data generation device that generates a wave motion using a probe, acquires a reflection signal based on a reflection wave obtained from an inspection object, and generates tomographic data on a basis of the reflection signal.

14. The wave motion analysis device according to claim 2, wherein the multiple reflection area extractor extracts the multiple reflection area on a basis of a preset parameter.

15. The wave motion analysis device according to claim 9, further comprising a reconstructor/outputter that reconstructs the planar cross-sectional data in a selected principal component direction to generate cross-sectional image data in the principal component direction.

16. The wave motion analysis device according to claim 10, further comprising a reconstructor/outputter that reconstructs data of the solid portion in a selected principal component direction to generate image data in the principal component direction.

17. The scanning device according to claim 11, wherein the tomographic data generator generates the tomographic data by converting the reflection signal into luminance data.

18. The scanning device according to claim 17, wherein the tomographic data generator logarithmically compresses the reflection signal and converts the reflection signal into the luminance data.

19. A wave motion analysis method for detecting a defect of an inspection object on a basis of a reflection wave obtained from the inspection object, the wave motion analysis method comprising:

acquiring tomographic data generated on a basis of the reflection wave;

extracting, from the tomographic data, a multiple reflection area that corresponds to a depth range deeper than a depth at which a real image of the inspection object is able to be detected in the tomographic data and in which a multiple reflection signal is able to be detected; and detecting a multiple reflection image corresponding to the defect of the inspection object from the extracted multiple reflection area, wherein, the wave motion analysis method further comprises, in the extracting, designating, as a specific time area, a time area that is equal to or longer than a time in which the reflection wave from an inspection target range of the inspection object reaches and has a predetermined length, and specifying, as the multiple reflection area, an area where image data based on a reflection signal obtained in the specific time area exists in the tomographic data.

20. A non-transitory recording medium storing a computer readable program that causes a computer to perform a wave motion analysis processing of detecting a defect of an inspection object on a basis of a reflection wave obtained from the inspection object, the wave motion analysis processing comprising:

acquiring tomographic data generated on the basis of the reflection wave;

extracting, from the tomographic data, a multiple reflection area that corresponds to a depth range deeper than a depth at which a real image of the inspection object is able to be detected in the tomographic data and in which a multiple reflection signal is able to be detected; and detecting a multiple reflection image corresponding to the defect of the inspection object from the extracted multiple reflection area, wherein, the wave motion analysis processing further comprises, in the extracting, designating, as a specific time area, a time area that is equal to or longer than a time in which the reflection wave from an inspection target range of the inspection object reaches and has a predetermined length, and specifying, as the multiple reflection area, an area where image data based on a reflection signal obtained in the specific time area exists in the tomographic data.

\*　　\*　　\*　　\*　　\*